United States Patent
Nieten et al.

(10) Patent No.: US 10,832,612 B2
(45) Date of Patent: Nov. 10, 2020

(54) PROJECTOR FOR PROJECTING A MULTI-COLORED IMAGE

(71) Applicant: Carl Zeiss Jena GmbH, Jena (DE)

(72) Inventors: Christoph Nieten, Jena (DE); Bryce Anton Moffat, Jena (DE); Enrico Geissler, Jena (DE); Alexander Gratzke, Jena (DE); Axel Krause, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 16/028,400

(22) Filed: Jul. 5, 2018

(65) Prior Publication Data

US 2019/0012950 A1 Jan. 10, 2019

(30) Foreign Application Priority Data

Jul. 6, 2017 (DE) .................... 10 2017 115 092

(51) Int. Cl.
*G09G 3/20* (2006.01)
*H04N 9/31* (2006.01)
*G09G 3/02* (2006.01)

(52) U.S. Cl.
CPC .......... *G09G 3/2022* (2013.01); *G09G 3/025* (2013.01); *G09G 3/2003* (2013.01);
(Continued)

(58) Field of Classification Search
CPC .... G09G 3/025; G09G 3/2022; G09G 3/2003; G09G 3/001; G09G 3/2014;
(Continued)

(56) References Cited

U.S. PATENT DOCUMENTS 8,125,702 B2   2/2012  Ward et al.
2007/0103646 A1*  5/2007  Young .................. H04N 9/3155
                                                               353/52
(Continued)

FOREIGN PATENT DOCUMENTS

DE   102008029788 B4   11/2016

OTHER PUBLICATIONS

Wikipedia, Color space, https://en.wikipedia.org/w/index.php?title=Color_space&oldid=849421220, Jul. 8, 2018, 5 pages.
(Continued)

*Primary Examiner* — Christopher E Leiby
(74) *Attorney, Agent, or Firm* — Skaar Ulbrich Macari, P.A.

(57) ABSTRACT

In a projector for projecting a multi-colored image, a control unit actuates each color channel with reference to fed-in image data such that one of the color subframes of the multi-colored image to be projected is generated. A projection optical system images the generated color subframes onto a projection surface such that the color subframes can be perceived as the multi-colored image to be projected. Each color channel is formed for the generation of a color subframe of a predetermined base color. The color location of the predetermined base color varies with the lightness to be generated. The control unit controls each color channel such that, for at least one picture point in the multi-colored image, the color location shift of the predetermined target color location caused by the color channel or the color channels is compensated for while retaining the target lightness.

13 Claims, 17 Drawing Sheets

(52) U.S. Cl.
CPC ......... *H04N 9/3114* (2013.01); *H04N 9/3126* (2013.01); *H04N 9/3182* (2013.01); *G09G 2310/0235* (2013.01); *G09G 2320/0242* (2013.01); *G09G 2320/0646* (2013.01); *G09G 2320/0666* (2013.01)

(58) Field of Classification Search
CPC ... G09G 2310/0235; G09G 2320/0666; G09G 2320/0242; G09G 2320/0646; G09G 2320/0238; G09G 2320/0233; G09G 5/10; G09G 2360/16; H04N 9/3126; H04N 9/3114; H04N 9/3182; G03B 21/005
See application file for complete search history.

(56) References Cited

U.S. PATENT DOCUMENTS

| | | |
|---|---|---|
| 2011/0175953 A1 | 7/2011 | Geissler |
| 2014/0204134 A1* | 7/2014 | Goerzen .............. H04N 9/3105 345/697 |
| 2017/0206822 A1 | 7/2017 | Moffat et al. |
| 2018/0090103 A1* | 3/2018 | Zhang .................... G01K 1/026 |

OTHER PUBLICATIONS

DIN EN ISO 11664-1 (Colorimetry-Part 1: CIE standard colorimetric observers (ISO 11664-1:2007), Jul. 2011, 40 pages.

* cited by examiner

Fig. 23

| RGB input | | | 1-3DMD SdT | | | ideal | RGB1 | R2 | G2 | B2 | 1-3DMD + boost | | | | | |
| R | G | B | L | x | y | L | | | | | t01r/r₀ | t01g/r₀ | t01b/r₀ | L | x | y |
| 255 | 255 | 255 | 1 | 0.295 | 0.329 | 1 | 255 | 255 | 255 | 255 | | | | 1 | 0.295 | 0.329 |
| 20 | 20 | 20 | 0.00371 | 0.295 | 0.328 | 0.00370 | 20.1 | 20 | 20 | 20 | | | | 0.00371 | 0.295 | 0.328 |
| 10 | 10 | 10 | 0.00081 | 0.295 | 0.328 | 0.00080 | 10.1 | 10 | 10 | 10 | | | | 0.00081 | 0.295 | 0.328 |
| 9 | 9 | 9 | 0.00065 | 0.295 | 0.328 | 0.00064 | 9.05 | 9 | 9 | 9 | | | | 0.00065 | 0.295 | 0.328 |
| 8 | 8 | 8 | 0.00050 | 0.295 | 0.328 | 0.00049 | 0 | 156.8 | 134.8 | 66.5 | 0.8017 | 0.7485 | 0.5430 | 0.00050 | 0.295 | 0.328 |
| 7 | 7 | 7 | 0.00038 | 0.295 | 0.327 | 0.00037 | 0 | 82.1 | 70.6 | 34.8 | 0.5975 | 0.5578 | 0.4045 | 0.00037 | 0.295 | 0.328 |
| 6 | 6 | 6 | 0.00027 | 0.295 | 0.327 | 0.00026 | 0 | 38.9 | 33.4 | 16.5 | 0.4255 | 0.3972 | 0.2879 | 0.00027 | 0.295 | 0.328 |
| 5 | 5 | 5 | 0.00018 | 0.294 | 0.326 | 0.00018 | 0 | 16.1 | 13.8 | 6.8 | 0.2847 | 0.2657 | 0.1925 | 0.00018 | 0.295 | 0.328 |
| 4 | 4 | 4 | 0.00012 | 0.293 | 0.325 | 0.00011 | 0 | 5.4 | 4.7 | 2.3 | 0.1740 | 0.1624 | 0.1174 | 0.00011 | 0.295 | 0.328 |
| 3 | 3 | 3 | 6.54E-05 | 0.292 | 0.322 | 5.69E-05 | 0 | 1.3 | 1.2 | 0.6 | 0.0921 | 0.0859 | 0.0619 | 5.77E-05 | 0.295 | 0.328 |
| 2 | 2 | 2 | 3.18E-05 | 0.288 | 0.315 | 2.33E-05 | 0 | 0.2 | 0.2 | 0.1 | 0.0374 | 0.0348 | 0.0248 | 2.36E-05 | 0.295 | 0.328 |
| 1 | 1 | 1 | 1.35E-05 | 0.278 | 0.298 | 5.08E-06 | 0 | 0.006 | 0.005 | 0.002 | 0.0076 | 0.0071 | 0.0047 | 5.14E-06 | 0.295 | 0.328 |
| 0 | 0 | 0 | 4.48E-07 | 0.247 | 0.239 | 0 | 0 | 0 | 0 | 0 | 0 | 0 | 0 | 4.48E-07 | 0.247 | 0.239 |

Fig. 24

| RGB input | | | 1-3DMD SdT | | | ideal | R1 | R2 | G2 | B2 | 1-3DMD + boost | | | | | |
| R | G | B | L | x | y | L | | | | | t01r/r₀ | t01g/r₀ | t01b/r₀ | L | x | y |
| 255 | 0 | 0 | 1 | 0.645 | 0.355 | 1 | 255 | 255 | 0 | 0 | | | | 1 | 0.645 | 0.355 |
| 20 | 0 | 0 | 0.00374 | 0.638 | 0.354 | 0.00370 | 20.1 | 20 | 0 | 0 | | | | 0.00374 | 0.639 | 0.354 |
| 10 | 0 | 0 | 0.00085 | 0.619 | 0.350 | 0.00080 | 10.1 | 10 | 0 | 0 | | | | 0.00085 | 0.621 | 0.350 |
| 9 | 0 | 0 | 0.00068 | 0.614 | 0.349 | 0.00064 | 9.05 | 9 | 0 | 0 | | | | 0.00068 | 0.615 | 0.349 |
| 8 | 0 | 0 | 0.00054 | 0.606 | 0.347 | 0.00049 | 0 | 153.7 | 0.007 | 0.008 | 0.7944 | 0.0085 | 0.0091 | 0.00053 | 0.615 | 0.349 |
| 7 | 0 | 0 | 0.00041 | 0.595 | 0.345 | 0.00037 | 0 | 80.5 | 0.004 | 0.004 | 0.5920 | 0.0062 | 0.0065 | 0.00039 | 0.615 | 0.349 |
| 6 | 0 | 0 | 0.00030 | 0.579 | 0.342 | 0.00026 | 0 | 38.1 | 0.0015 | 0.0016 | 0.4216 | 0.0042 | 0.0044 | 0.00028 | 0.615 | 0.349 |
| 5 | 0 | 0 | 0.00022 | 0.555 | 0.338 | 0.00018 | 0 | 15.8 | 0.0005 | 0.0005 | 0.2821 | 0.0026 | 0.0026 | 0.00019 | 0.615 | 0.349 |
| 4 | 0 | 0 | 0.00015 | 0.518 | 0.330 | 0.00011 | 0 | 5.3 | 0.00012 | 0.00010 | 0.1724 | 0.0013 | 0.0012 | 0.00011 | 0.615 | 0.349 |
| 3 | 0 | 0 | 1.00E-04 | 0.461 | 0.319 | 5.69E-05 | 0 | 1.3 | 0.000009 | 0.000002 | 0.0913 | 0.0004 | 0.0002 | 6.08E-05 | 0.615 | 0.349 |
| 2 | 0 | 0 | 6.65E-05 | 0.382 | 0.304 | 2.33E-05 | 0 | 0.2 | 0 | 0 | 0.0370 | 0 | 0 | 2.56E-05 | 0.593 | 0.341 |
| 1 | 0 | 0 | 4.83E-05 | 0.301 | 0.288 | 5.08E-06 | 0 | 0.005 | 0 | 0 | 0.0076 | 0 | 0 | 7.05E-06 | 0.478 | 0.307 |
| 0 | 0 | 0 | 2.29E-06 | 0.247 | 0.239 | 0 | 0 | 0 | 0 | 0 | 0 | 0 | 0 | 2.29E-06 | 0.247 | 0.239 |

PROJECTOR FOR PROJECTING A MULTI-COLORED IMAGE

PRIORITY

The present application claims the priority of the German patent application no. 10 2017 115 092.7, filed Jul. 6, 2017, wherein the whole content of this application is hereby incorporated by reference herein.

FIELD

The present invention relates to a projector for projecting a multi-colored image.

BACKGROUND

Projectors for projecting a multi-colored image can be used, for example, for simulators (e.g. flight simulators or other simulators for example for cars, HGVs, motorbikes, etc.), for cinema or film projections, for projections onto domes (e.g. planetariums) or for other projections. In order to achieve a good contrast with such projectors, it is known to modulate the light with two light modulators connected in series and then to project it.

However, it has been established that a color-correct image representation of the color in the case of low image lightnesses is difficult.

SUMMARY

An object of certain embodiments of the invention is to provide a projector for projecting a multi-colored image with which an image reproduction that is as color-correct as possible can be achieved.

The disclosure includes a projector for projecting a multi-colored image. The projector can comprise several color channels in order to generate the color subframes of the multi-colored image to be projected. Each color channel can comprise a first modulator, which comprises several first pixels that are controllable independently of each other in order to modulate light from a light source by which the first modulator can be impinged, an imaging optical system and a second modulator, which comprises several second pixels that are controllable independently of each other, and which can be impinged by the light modulated by the first modulator by means of the imaging optical system and modulates it by means of the second pixels in order to generate a color subframe. The projector can furthermore comprise a control unit, which controls each color channel based on fed-in image data such that one of the color subframes of the multi-colored image to be projected is generated, and a projection optical system, which images the generated color subframes onto a projection surface such that the color subframes can be perceived as the multi-colored image to be projected. Each color channel can be formed for the generation of a color subframe of a predetermined base color, wherein the color location of the predetermined base color varies with the lightness to be generated. The control unit can control each color channel such that, for at least one picture element (picture point) in the multi-colored image, which is to comprise a predetermined target color location and a predetermined target lightness according to the image data, the color location shift of the predetermined target color location caused by the color channel or the color channels is compensated for while retaining the target lightness. It is thus possible to compensate for the color location shift in the generated or in the projected multi-colored image that is slightly perceptible precisely in the case of low target lightnesses, with the result that the desired color-correct image reproduction or color-correct image generation is achieved.

At least one of the color channels can have a wavelength-dependent contrast which leads to the shift of the color location (or chromaticity position) with the lightness to be generated. This wavelength-dependent contrast is compensated for correspondingly by the control unit during the control, with the result that the color location shift can be avoided.

A shift of the color location in the direction of a larger blue portion often occurs. This shift is compensated for according to the disclosed embodiments. In particular, the shift is compensated for so strongly that any residual shift still present is so small that it lies below the perception threshold of an observer. For example, a distance greater than 0.003 in the standard color chart of the CIE standard valence system at a $\gamma$ of 2.2 can be assumed as perception threshold.

During control of the color channels, the control unit can bring about a greater compensation as the target lightness decreases. This leads to very good results.

The control unit can have predetermined and stored correction values for the color channels for target color locations that can be generated by means of the projector with allocated target lightnesses, wherein the control unit uses the correction values for compensation during control of the color channels. Thus the effort of determining the correction values only has to be made once for a projector. The thus-determined correction values can then be used continuously during operation.

In the projector, each second pixel can be allocated at least one first pixel in such a way that the imaging optical system:
  a) strikes the second pixel with light from the respectively allocated first pixel when the allocated first pixel is switched into the first state, in order to actively illuminate the second pixel, and
  b) does not strike the second pixel with light from the respectively allocated first pixel when the first allocated pixel is switched into the second state, in order not to actively illuminate the second pixel, with the result that only unavoidable residual light strikes the second pixel, wherein the control unit controls the modulators such that, at least for one second pixel which, according to the image data, is to represent a lightness value which is greater than zero and smaller than a predetermined first threshold value,
  c) the at least one second pixel is switched into the second state and the allocated first pixel or pixels is or are switched into the first state for lightness modulation only for the period or periods in which the second pixel is switched into the second state, with the result that modulated residual light then emanates from the at least one second pixel, which contributes to the image generation, or
  d) the allocated first pixel or pixels is or are switched into the second state at least in the periods in which the second pixel is switched into the first state, with the result that no active illumination takes place and the second pixel modulates the residual light.

With this procedure, unavoidable residual light is thus used for the modulation of picture points with low lightness in the case of connecting two modulators in series. Low lightness (or low brightness) values can thus be represented and in particular represented so differently that an observer can perceive them. The maximum contrast of the projector is thereby increased further.

The control unit can adapt the compensation to the color location with the threshold value as target lightness value. It is thus ensured that no color jump occurs in the case of these low lightness values.

The control unit can control the modulating pixel for the generation of the modulated residual light based on a lightness value which is greater than the target lightness according to the image data.

In particular, the control unit can actuate the modulators by means of pulse-width modulated control data. The modulators can be formed as reflective modulators. Furthermore, they can be formed as two-dimensional modulators. It is also possible for the modulators to be formed as transmissive modulators.

The color channels can share the first or the second modulator. In this case, e.g., projectors can be provided with one first modulator and n second modulators or n first modulators and one second modulator, wherein n is an integer greater than 1. However, it is also possible to provide n first modulators and m second modulators. n and m are integers, of which at least one is greater than 1. In particular, n and m can also be equal. Thus, n and m can be 3, for example.

By the lightness value or the target lightness according to the image data is meant here, in particular, an input greyscale value or control value for the modulators which has a value from a set value range. Thus, the value range can have e.g. whole-number values from 0 to 255, wherein 0 is to be the lowest lightness, and thus black, and 255 is to be the greatest lightness. This applies to every base color of the corresponding color channel.

The modulating pixel for the generation of the modulated residual light can be called a boosted pixel, as it is actuated with a lightness value greater than the target lightness according to the image data. The fact that the residual light or the background lightness is relatively low is taken into account by increasing the lightness value used for the control (actuation).

The control unit can actuate the modulating pixel for the generation of the modulated residual light such that the increased lightness value or actuation value corresponds to at least 10 times the lightness value according to the image data in the case of an assumed division of the range from minimum to maximum lightness into 256 stages. The factor can also be greater than 10. In particular, it preferably lies in the range of from 10 to 50, 15 to 45, 20 to 40, 25 to 45 or 28 to 38. Preferred values for the factor are 18, 25, 26 and 46. In particular, the value of the factor can be chosen in dependence on the contrast of the projector.

In the case of a contrast of 500:1, e.g., a factor of 18 can be chosen. This factor is preferably applied to the lightness values of from 1 to 14 (the predetermined first threshold value is thus 15). In the case of a contrast of 1000:1, e.g., a factor of 25 can be chosen. This factor is preferably applied to lightness values of from 1 to 10. In the case of a contrast of 2000:1, e.g., a factor of 36 can be chosen. This factor is preferably applied to lightness values of from 1 to 7. In the case of a contrast of 4000:1, e.g., a factor of 46 can be chosen; this factor is preferably applied to the lightness values of from 1 to 5 or from 1 to 6 (the predetermined first threshold value is then 6 or 7 respectively). A larger factor is thus preferably chosen if the contrast is higher.

This need not be a fixed factor for all boostable greyscale values (lightness values which are greater than zero and smaller than or equal to the predetermined first threshold value). An individual factor can be set for each boostable greyscale value.

In particular, the control unit controls the two modulators by means of pulse-width modulated control data. A very accurate control is thus possible. In particular, the control of the two modulators can be synchronized well.

The control unit can determine, as the at least one second pixel, such a second pixel with a lightness value predefined by the image data that is greater than zero and smaller than or equal to the first threshold value.

Furthermore, the control unit can determine the at least one second pixel, which modulates the residual light, using the following steps:
a) at least one second pixel is selected with a lightness value predefined by the image data that is greater than zero and smaller than or equal to the first threshold value, and
b) a selected second pixel is determined as a second pixel modulating the residual light when (preferably only when) all k neighbouring pixels (preferably in one direction, thus first directly neighbouring pixel, second neighbouring pixel, which is the direct neighbour of the first directly neighbouring pixel, etc.) are selected in step a). Here, k is a natural number greater than or equal to 1.

The control unit can determine the at least one second pixel, which modulates the residual light, using the following steps:
a) at least one second pixel is selected with a lightness value predefined by the image data that is greater than zero and smaller than or equal to the first threshold value, and
b) a selected second pixel is determined as a second pixel modulating the residual light when (preferably only when) all allocated first pixels are actuated on the basis of the image data in each case according to a lightness value which is smaller than a predetermined second threshold value, wherein the second threshold value is chosen such that the period or periods in which the allocated first pixels are to be switched into the first state do(es) not overlap with the period or periods in which the second pixel modulating the residual light is to be switched into the first state in order to modulate the residual light.

A temporal separation of the illumination of boosted pixels and unboosted pixels is thus achieved, which can be used at the boundary between a boostable pixel and an unboosted pixel advantageously in order reliably not to illuminate the boosted pixel which lies at the edge (with none of the first pixels allocated to it) and to sufficiently illuminate the unboosted pixel which lies at the edge, although at least one illumination pixel of the unboosted pixel also illuminates the boosted pixel (but only at times when the boosted pixel is not switched into the second state).

Step b) can preferably be carried out only for boostable second pixels (=pixels selected in step a)) the kth neighbouring pixel of which (in each case preferably in one direction, thus first directly neighbouring pixel, second neighbouring pixel, which is the direct neighbour of the first directly neighbouring pixel, etc.) is not boostable (according to step a)). The first neighbouring pixels can surround the considered boostable second pixel in an annular manner. The second neighbouring pixels can annularly surround both the considered boostable second pixel and the first neighbouring pixels. This applies in the same way to third, fourth and further neighbouring pixels. Here, k is a natural number greater than or equal to 1. If all 1 to k neighbouring pixels of a boostable second pixel are boostable, the second pixel can be boosted (=selected second pixel). With the choice of k, in particular, the second pixel furthest away from the boostable second pixel can be set, during the active illumination of which light (in particular to such an extent or in such a proportion) still strikes the boostable second pixel, which would be disruptive in the case of residual light modulation by the boostable second pixel. If each second pixel is allocated a first main illumination pixel and n pixels neighbouring it (in one direction), wherein n is a natural number greater than or equal to 1, k is preferably set equal to n.

For the actuation of the first pixels, the lightness value which is the highest of all second pixels, to which the first pixel is allocated, can be chosen on the basis of the image data.

With the projector according to the disclosure, the images can preferably be projected in each case for a predetermined frame duration. In particular, the first pixel or pixels allocated to the at least one second pixel can be switched into the second state during the entire frame duration. Each second pixel can be allocated precisely one first pixel. However, it is also possible for each second pixel to be allocated one first pixel as well as at least one further first pixel directly neighbouring this first pixel. Furthermore, each second pixel can be allocated a first pixel as well as at least the further first pixel directly neighbouring this first pixel. Not only can the directly neighbouring further first pixels be allocated, but also the further neighbours in each case. It can also be said that each second pixel is allocated a first pixel as well as further first pixels which are spaced apart from this first pixel by no more than n pixels. n is a natural number greater than or equal to 1. The allocated first pixels are characterized in particular in that the light coming from them is imaged by means of the imaging optical system at least partially onto the second pixel, to which the first pixel is allocated.

Furthermore, for second pixels which, according to the image data, are to represent a lightness value which is greater than the first threshold value, the control unit in the projector according to the invention can take into account the residual lightness in such a way that the second pixel is actuated on the basis of a reduced lightness value which is lower than the lightness value according to the image data. During the generation of the image, however, the second pixels are preferably at least sometimes switched into the first state at the same time as at least one allocated first pixel. The residual lightness which is also modulated by means of the second pixel can thus be taken into account as well, with the result that more precise greyscale values can be represented.

This is advantageous in particular for lightness values which, although they are greater than the first threshold value, are smaller than or equal to 20% or 30% of the maximum lightness value.

The modulators are preferably reflective modulators. In particular, the modulators are formed as tilting mirror matrices.

Where greyscale values or lightness values are discussed here, the greyscale values are to be understood as lightness values of the corresponding represented colors.

The projector can be formed for a multi-colored image representation. For this, for example, a multi-colored illumination can be provided which directs different base colors (primary colors) onto the first modulator in temporal succession. The base colors can be the colors red, green and blue. The temporal change of the base colors is carried out so quickly that an observer cannot distinguish between the color subframes (e.g. in the colors red, green and blue) generated in temporal succession and thus the observer only perceives one multi-colored image. To generate the colors following each other temporally, a so-called color wheel, which introduces different color filters into the beam path between the light source and the first modulator in succession, can be arranged between the light source (which emits e.g. white light) of the projector and the first modulator. However, any other type of time-sequential color generation is also possible.

Furthermore, a multi-colored illumination of the first modulator is also possible if e.g. three second modulators are provided which are then illuminated with the individual colors (e.g. red, green and blue). For this, for example, color-splitting cubes can be used. The three second modulators then generate the color subframes which are projected onto the projection surface in an overlapping manner by means of the projection optical system in order to generate the desired multi-colored image. Of course, it is also possible to provide more or fewer than three second modulators.

Of course, both boost variants described (step c) and d)) can also be combined such that second pixels and first pixels are boosted in temporal succession in the described manner.

Furthermore, a projector for projecting images is provided in which, for second pixels, the control unit takes into account the residual lightness in such a way that the second pixel is actuated on the basis of a reduced lightness value which is lower than the lightness value according to the image data. In particular, the second pixels, which are actuated with the reduced lightness value, are at least sometimes switched into the first state at the same time as at least one allocated first pixel. It is thus modulated mainly during active illumination of the second pixel. In addition, however, the modulation of the unavoidable residual light is taken into account for the desired lightness, which leads to more precise lightness values. This is advantageous in particular for low lightness values which are e.g. smaller than or equal to 30% of the maximum lightness value, or smaller than or equal to 20% of the maximum lightness value.

The imaging optical system can in particular be formed as a 1:1 imaging optical system. However, it can also be formed as a magnifying or demagnifying imaging optical system.

A 1:1 allocation between first and second pixels is preferably provided by the imaging optical system. Because of the actual implementation of the modulators and/or the imaging optical system, during the active illumination light from neighbouring first pixels can also be imaged onto the second pixels allocated according to the 1:1 allocation.

However, it is also possible to ensure, e.g. by means of the dimensions of the modulators used and/or the arrangement thereof, that the light from several first pixels is always imaged onto one second pixel.

The disclosed projector can comprise the light source as a constituent of the projector. Furthermore, the projector can comprise further means known to a person skilled in the art which are necessary for the operation of the projector.

The disclosure further includes a projection system. The system can include at least two of the disclosed projectors that are operated such that their projected images partially overlap in order to generate a larger total image. Such a projection system can be used, for example, for a projection onto a dome (e.g. in planetariums) or for flight simulators or other simulators (e.g. for cars, HGVs, motorbikes, etc.).

The disclosure additionally includes projection methods that the disclosed projector carries out during operation.

It is understood that the features mentioned above and those yet to be explained in the following are applicable, not only in the stated combinations, but also in other combinations or singly, without departing from the scope of the present invention.

Example embodiments of the invention are explained in even more detail below with reference to the attached drawings. These embodiment examples merely serve for illustration and are not to be interpreted as limiting. For example, a description of an embodiment example with a plurality of elements or components is not to be interpreted to the effect that all of these elements or components are necessary for the implementation. Instead, other embodiment examples can also contain alternative elements and components, fewer elements or components, or additional elements or components. Elements or components of different embodiment examples can be combined with each other, unless otherwise indicated. Modifications and variations which are described for one of the embodiment examples can also be applicable to other embodiment examples. To avoid repetitions, elements that are identical or correspond to each other are given the same reference numbers in different figures and are not explained repeatedly.

BRIEF DESCRIPTION OF THE DRAWINGS

FIG. 23 is a table of calculated greyscale values for the projector according to the invention for white.

FIG. 24 is a table of calculated greyscale values for the projector for red.

Figure 1:
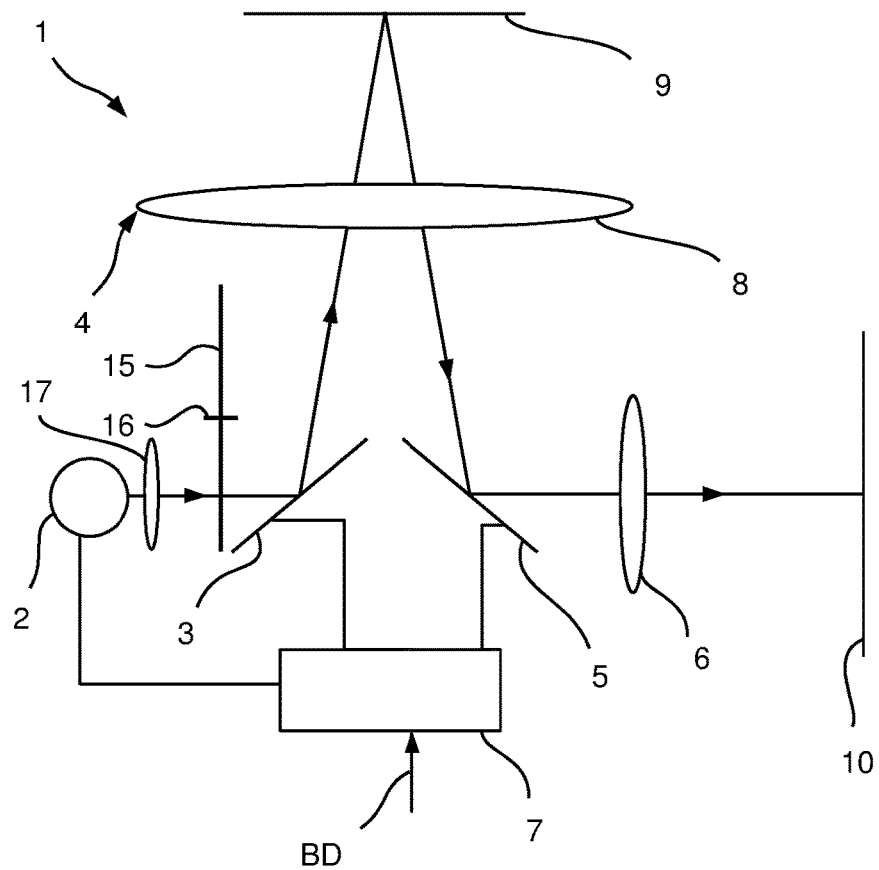
FIG. 1 is a schematic representation of an embodiment of the projector according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention is explained in yet more detail below with the aid of embodiment examples with reference to the attached drawings, which also disclose features essential to the invention. These embodiment examples merely serve the purpose of illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components. Elements or components of different embodiment examples can be combined with each other, unless otherwise indicated. Modifications and alterations which are described for one of the embodiment examples can also be applicable to other embodiment examples. To avoid repetitions, the same or corresponding elements are given the same reference numbers in different figures and are not explained repeatedly.

In the embodiment shown in FIG. 1 the projector 1 according to the invention comprises, for projecting images for, in each case, a predetermined frame duration, a light source 2, an illumination optical system 17, an illumination modulator 3, an imaging optical system 4, an image modulator 5, a projection optical system 6 as well as a control unit 7.

The two modulators 3, 5 are in each case formed as a tilting mirror matrix (also called DMD in the following), which comprise several tilting mirrors arranged in rows and columns, wherein the tilting mirrors can be brought into a first and a second tilting position independently of each other.

Figure 2:
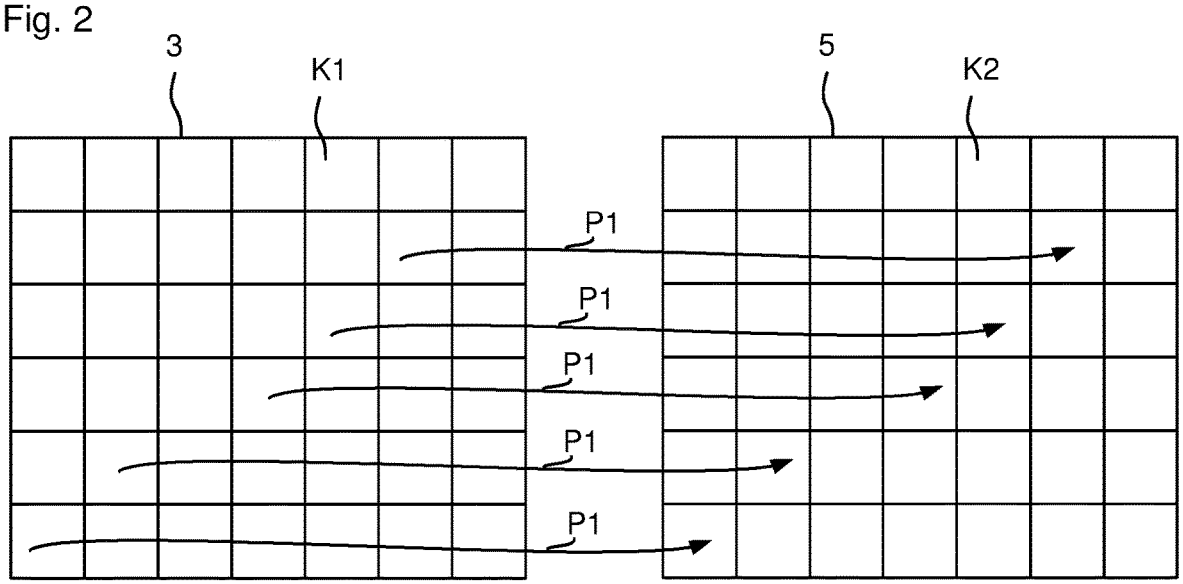
FIG. 2 is a schematic representation to explain the allocation between the first pixels of the first modulator and the second pixels of the second modulator.

In the embodiment example described, the illumination modulator 3 comprises several tilting mirrors K1 (also called illumination pixels in the following) and the image modulator 5 comprises several tilting mirrors K2 (also called image pixels in the following). In FIG. 2, 6×7 tilting mirrors K1, K2 are represented schematically in each case. The tilting mirrors K1 and K2 in each case have the same dimensions, wherein the small number of tilting mirrors K1 and K2 is assumed merely to simplify the representation. Of course, the modulators 3, 5 can contain very many more tilting mirrors K1, K2 than represented.

The imaging optical system 4 is formed as a 1:1 imaging optical system with a lens 8 and a mirror 9, and images each tilting mirror K1 of the illumination modulator 3 precisely onto one tilting mirror K2 of the image modulator 5, as is indicated by the arrows P1. Thus, each illumination pixel K1 of the illumination modulator 3 is allocated precisely one image pixel K2 of the image modulator 5 because of the imaging by means of the imaging optical system 4. It can also be said that each image pixel K2 is allocated precisely one illumination pixel K1.

The two modulators 3 and 5 are controlled by the control unit 7 on the basis of fed-in image data BD for each of the images to be projected in succession such that the illumination modulator 3, which is impinged by the light (e.g. white light) of the light source 2, is a two-dimensionally modulated light source for the image modulator 5, with which the image to be projected is generated or modulated, which is then projected onto a projection surface 10 by means of the projection optical system 6. In order to provide the two-dimensionally modulated light source, the projector 1 is formed such that the light which is reflected by the tilting mirrors K1 of the illumination modulator 3 located in the first tilting position is imaged onto the allocated tilting mirror K2 of the image modulator 5. The light reflected by the tilting mirrors K1 of the illumination modulator 3 located in the second tilting position is collected by a beam trap (not shown) and is thus not imaged onto the image modulator 5. The image generation or modulation is then effected by means of the tilting position of the image pixels (=tilting mirror K2 of the image modulator 5), as only the light reflected by the image pixels K2 located in the first tilting position is projected onto the projection surface 10 via the projection optical system 6. The light reflected by the image pixels K2 located in the second tilting position is not projected onto the projection surface 10, but is, e.g., collected in a beam trap (not shown). Through the tilting position of the image pixels K2, the image to be projected is thus modulated or generated, and projected by means of the projection optical system 6. The first tilting position can also be called the on state and the second tilting position can also be called the off state.

Figure 3:
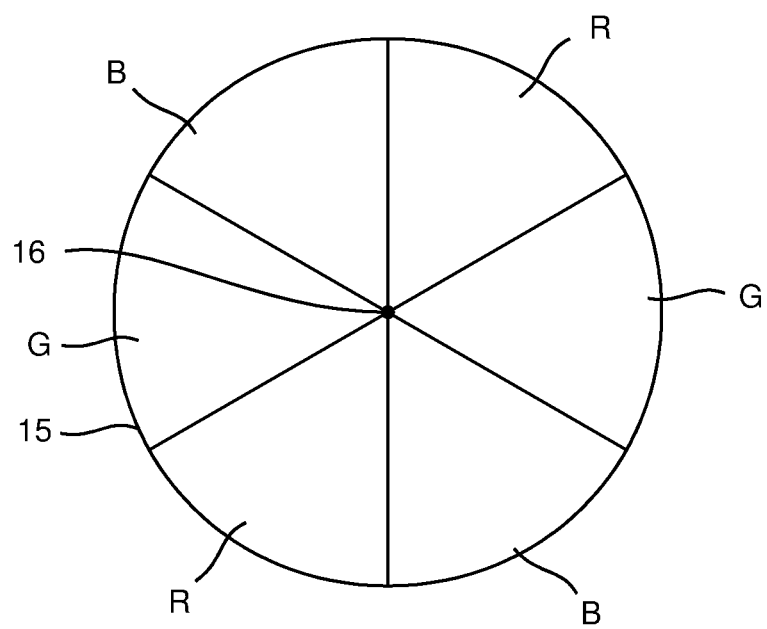
FIG. 3 is a schematic representation of the color wheel 15 from FIG. 1.

For a colored image generation, a color wheel 15 is arranged in the beam path between the light source 2 and the first modulator 3. The colors are generated time-sequentially via the color wheel 15, which is represented schematically with its axis of rotation 16. FIG. 3 shows a top view of the color wheel 15, which has six color segments of the same size (which thus extend over an angle range of 60). The color segments are labelled with the capital letters R, G and B. This is to illustrate that the corresponding color segment only allows the color red (in the case of R), the color green (in the case of G) and the color blue (in the case of B) to pass through, with the result that, from the white light from the light source 2, red, green or blue light strikes the illumination modulator 3 time-sequentially. Thus, by means of the two modulators 3, 5, red, green and blue subframes can be projected in temporal succession. These are generated following each other temporally so rapidly that only the superimposition, and thus a color image, can be perceived by an observer. This can be achieved, for example, in the case of an image rate or frame rate of f=60 Hz by rotating the color wheel 15 at a frequency of 120 Hz. There are thereby four red passes, four green passes and four blue passes within one frame. For each color transition, 15° is subtracted, the so-called spoke. During this period of time both modulators 3, 5 are switched to dark in order to prevent an undefined color projection, as one color segment boundary of the color wheel 15 just crosses the illumination light. Thus, four time segments with a color wheel segment size of 45° remain per color (red, green and blue) for a color modulation.

Figure 4:
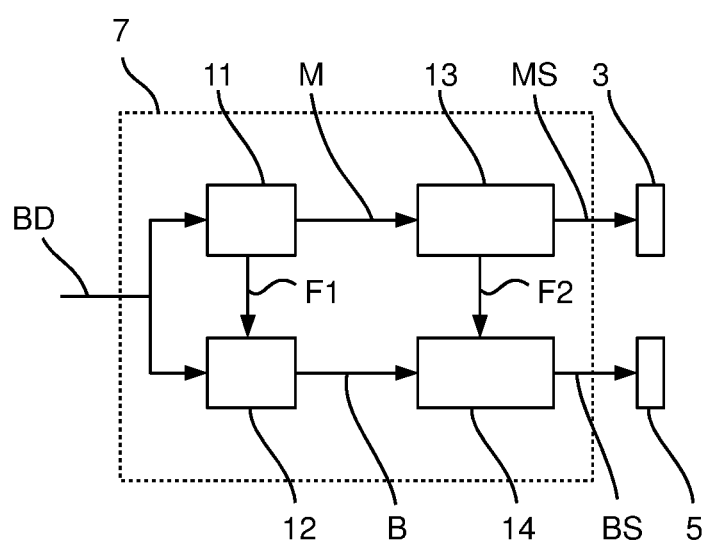
FIG. 4 is a schematic representation of the control unit 7 from FIG. 1 to explain the generation of pulse-width modulated pattern control data MS and pulse-width modulated image control data BS.

The image data BD are already present in digital form with the suitable pixel resolution for the image modulator 5 and are applied to a first and second pattern generator 11 and 12 simultaneously in the control unit 7, as is shown schematically in FIG. 4. The first pattern generator 11 generates pattern data M, which are applied to first control electronics 13, with reference to the fed-in image data BD. The first control electronics 13 generate pulse-width modulated illumination control data MS on the basis of the pattern data M and apply these to the illumination modulator 3.

The second pattern generator 12 generates frame data B, which are applied to second control electronics 14 for the image modulator 5, with reference to the fed-in image data BD. The second control electronics 14 generate pulse-width modulated image control data BS and apply these to the image modulator 5.

According to the illumination and image control data MS, BS, during the frame duration T for the generation of the image the illumination and image pixels K1, K2 are brought into the first and second tilting position such that the desired image is generated and projected.

Through the series connection of the two modulators 3, 5 as well as the generation, described below, of the illumination and image control data MS, BS, an improvement is achieved during operation of the projector 1 with respect to representing color as correctly as possible in the case of low lightness values.

Figure 5:
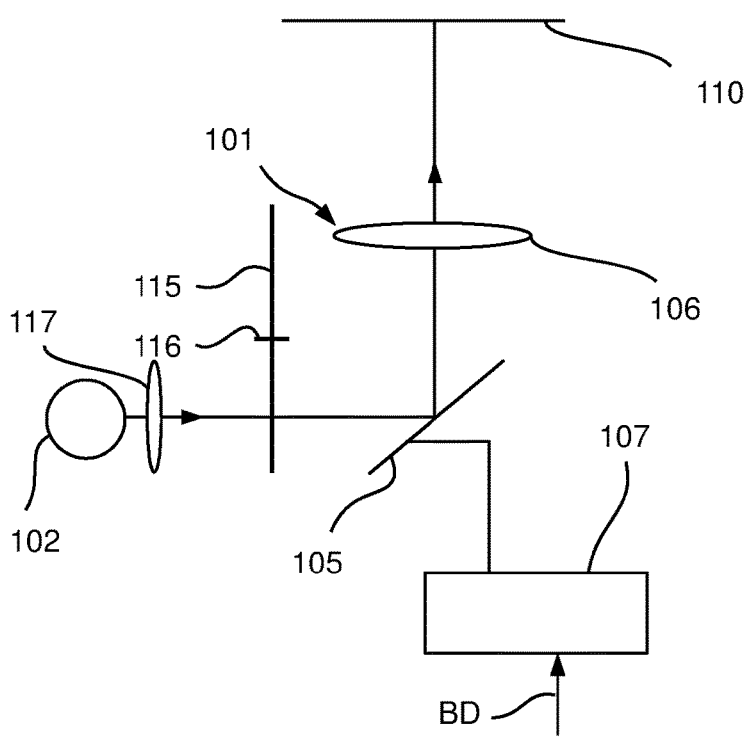
FIG. 5 is a schematic representation of a known projector with single modulation.

Projector 101 with Single Modulation According to FIG. 5

For the better understanding of the projector 1 according to the invention, a projector 101 with single modulation, which comprises only one modulator 105, which is used as image modulator, is described in the following (FIG. 5). This projector 101 with single modulation (also called 1×DMD SdT in the following) comprises a light source 102, an illumination optical system 117 and a projection optical system 106, wherein the modulator 105, which can be formed as a tilting mirror matrix, is illuminated with light from the light source 102, which is run through a color wheel 115.

The color wheel 115 can be formed like the color wheel 15, with the result that the modulator 105 is illuminated time-sequentially with red, green and blue light. The modulator 105 modulates the red, green and blue light in temporal succession by means of the tilting mirrors of the modulator 105 that are controllable independently of each other in order to generate color subframes which are projected onto a projection surface 110 by means of the projection optical system 106 and can be perceived by an observer only together as a color image. The modulation is controlled by a control unit 107 on the basis of fed-in image data BD such that a desired lightness and color is achieved for each pixel. The light is thus guided from the light source 102 to the projection surface 110 only once via the modulator 105.

The spectrum S(λ) after a single modulation can be described as follows:

$$S_1(\lambda, g_1) = \int_\Omega d\Omega \int_{frame} dt \Sigma_{colours} \quad c \in (r,g,b) I(\Omega,t,\lambda) \cdot T_B(\Omega,\lambda) \cdot T_C(\Omega,c,\lambda) \cdot D_1(\Omega,t,c,\lambda,g_1) \cdot T_P(\Omega,\lambda) \quad (1)$$

With
c color; for example red, green and blue (r, g, b)
$g_1$ greyscale value which is represented on the image generator or modulator 105, can be the triple for r, g, b
$D_1(\Omega, t, c, \lambda, g_1)$ transmittance or reflectance of the image generator 105
$I(\Omega, t, \lambda)$ intensity of the light source 102
t time variable
$T_B(\Omega, \lambda)$ transmittance of the illumination optical system 117
$T_C(\Omega, c, \lambda)$ transmittance of all color splitters and combiners (here color wheel 115)
$T_P(\Omega, \lambda)$ transmittance of the projection optical system 116
λ wavelength; for example 400 nm to 700 nm
Ω solid angle Typically, the angle dependence of the individual optical elements can be eliminated by using an average over the solid angle Ω in the calculations. Furthermore, the transmittances of the imaging optical systems (illumination, projection) can be combined into a single function: $T_O(\lambda)$ (already averaged over the solid angle). As a result:

$$S_1(\lambda, g_1) = \int_{frame} dt \Sigma_{c \in (r,g,b)} I(t,\lambda) \cdot T_O(\lambda) \cdot T_C(c,\lambda) \cdot D_1(t,c,\lambda, g_1) \quad (2)$$

In order to convert the represented spectrum of a pixel into color and lightness, the standard spectral value functions $\bar{x}(\lambda)$, $\bar{y}(\lambda)$ and $\bar{z}(\lambda)$, as described e.g. in DIN EN ISO 11664-1, are used. These are multiplied in each case by the spectra S(λ, $g_1$) and integrated over the wavelengths λ in order to determine the color values X, Y and Z:

$$X(g_1) = \int_\lambda d\lambda S_1(\lambda, g_1) \cdot \bar{x}(\lambda) \quad (3)$$

$$Y(g_1) = \int_\lambda d\lambda S_1(\lambda, g_1) \cdot \bar{y}(\lambda) \quad (4)$$

$$Z(g_1) = \int_\lambda d\lambda S_1(\lambda, g_1) \cdot \bar{z}(\lambda) \quad (5)$$

The color values are often combined in one vector:

$$\vec{X}(g_1) = \begin{pmatrix} X(g_1) \\ Y(g_1) \\ Z(g_1) \end{pmatrix} \quad (6)$$

The color location (x, y)($g_1$) of a pixel (in dependence on the greyscale value $g_1$) then results as:

$$x(g_1) = \frac{X(g_1)}{X(g_1) + Y(g_1) + Z(g_1)} \quad (7)$$

$$y(g_1) = \frac{Y(g_1)}{X(g_1) + Y(g_1) + Z(g_1)} \quad (8)$$

The lightness of the pixel is described by $Y(g_1)$. Lightness and color location are in turn often described as a vector:

$$\vec{L}(g_1) = \begin{pmatrix} Y(g_1) \\ x(g_1) \\ y(g_1) \end{pmatrix} \quad (9)$$

The spectra of the individual components of the projector 101 according to FIG. 5 are represented in FIGS. 6 to 9. Here it was assumed that the DMD 105 has a contrast of 1500:1 in white.

Figure 6:
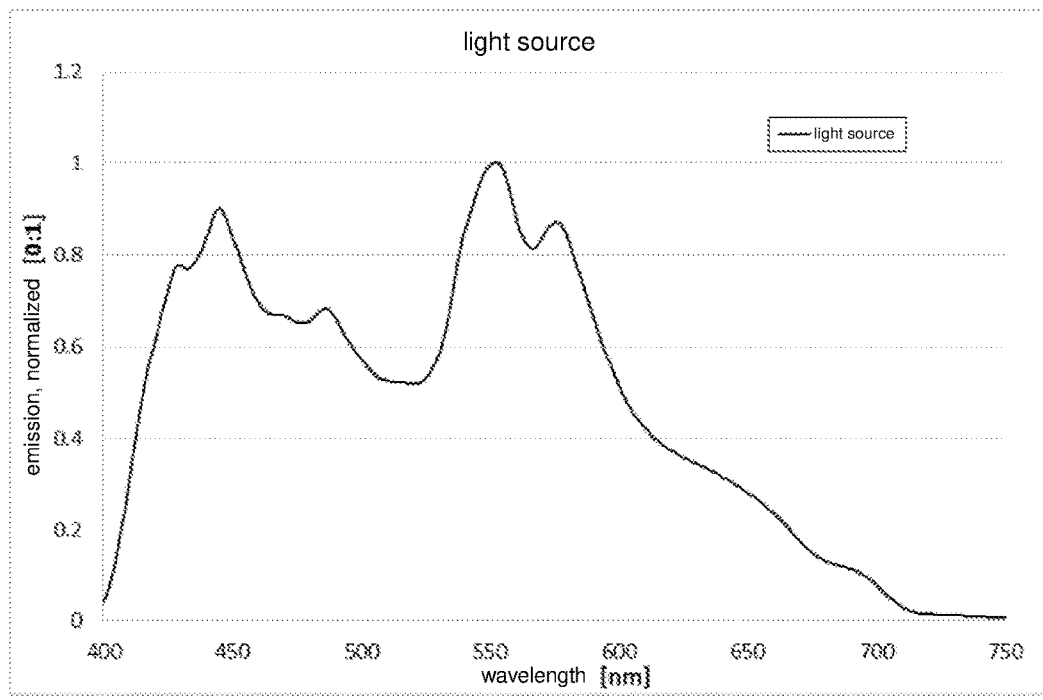
FIG. 6 is the emission spectrum, normalized to 1, of the light source 102 from FIG. 5.
Figure 7:
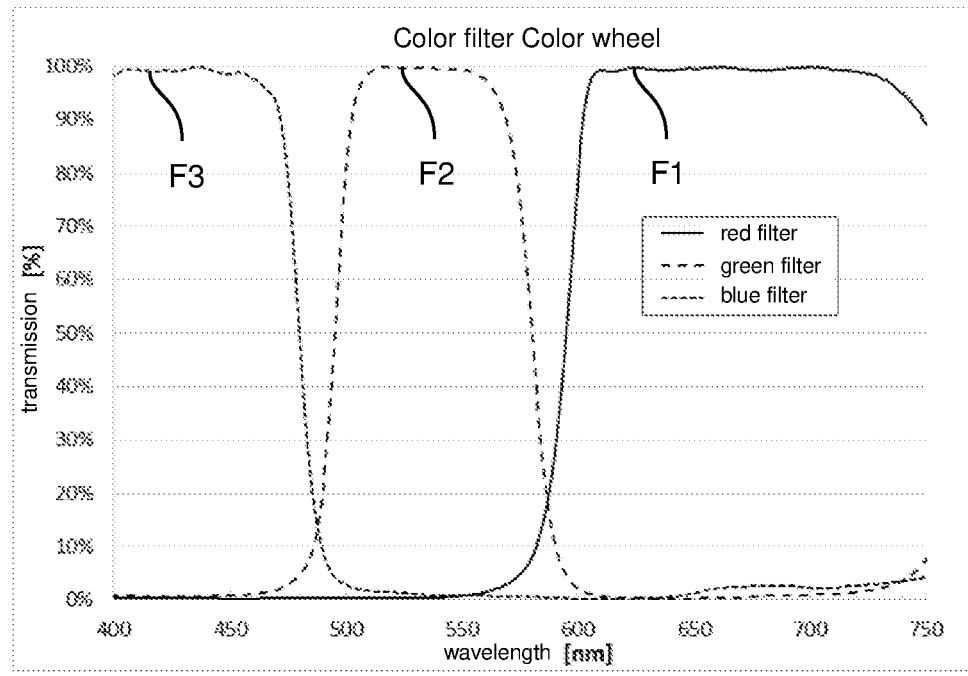
FIG. 7 is the transmission spectra of the red, green and blue color wheel segment of the color wheel 15 as well as 115, wherein the transmittance is plotted linearly along the y-axis.
Figure 8:
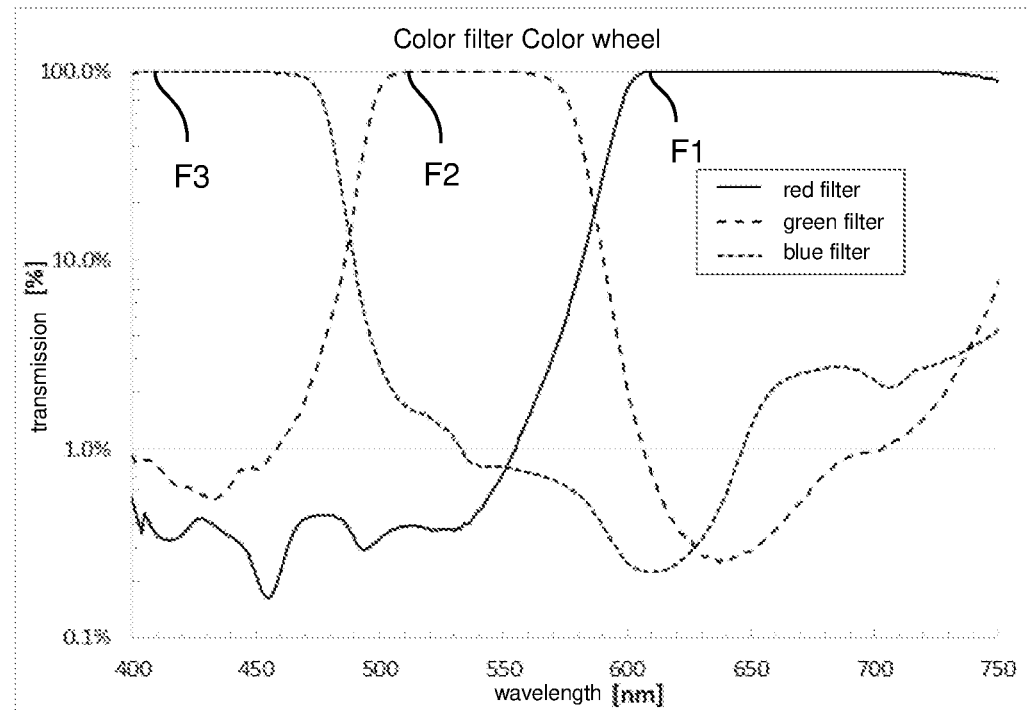
FIG. 8 is the transmission spectra of the red, green and blue color wheel segment of the color wheel 15 as well as 115, wherein the transmittance is plotted logarithmically along the y-axis.

FIG. 6 shows the emission spectrum of the light source 102 normalized to 1, wherein the wavelength in nm is plotted along the x-axis and the emittance normalized to 1 is plotted along the y-axis. FIGS. 7 and 8 in each case show the transmission spectra of the red color wheel segment (continuous line F1), of the green color wheel segment (dashed line F2) and of the blue color wheel segment (dotted line F3) of the color wheel 15 as well as 115, wherein in FIG. 7 the transmittance is plotted linearly along the y-axis and in FIG. 8 the transmittance is plotted logarithmically along the y-axis. In each case the wavelength in nm is plotted along the x-axis.

Figure 9:
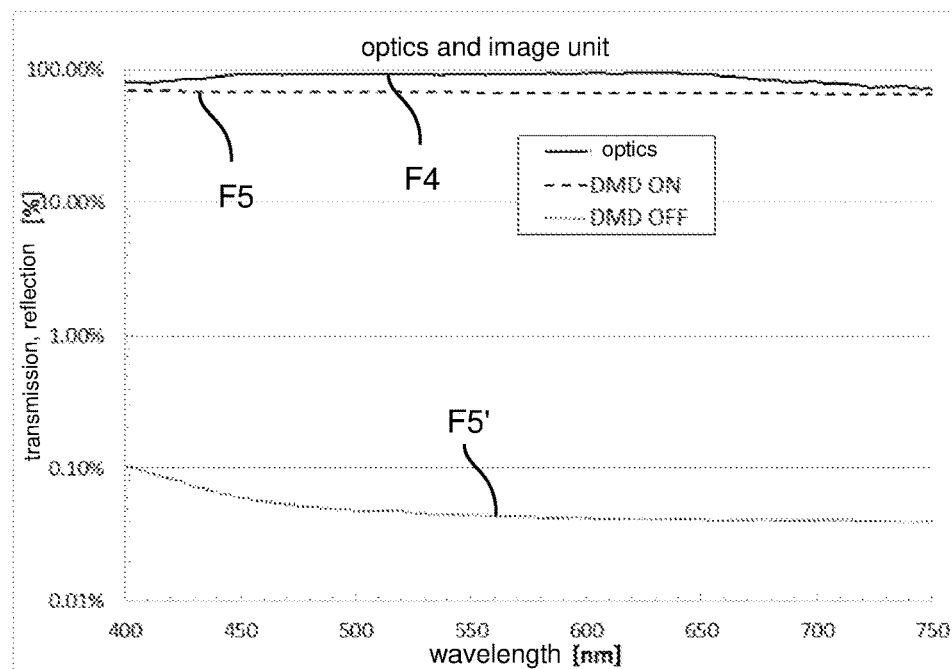
FIG. 9 is a logarithmic representation of the transmission spectrum of the projection optical system 106 as well as of the modulator 105 in the ON state and in the OFF state.

In FIG. 9, in a logarithmic representation, the transmission spectra of the projection optical system 106 as continuous line F4 as well as the reflectance spectrum of the modulator 105 in the On state as dashed line F5 and in the Off state as dotted line F5' are plotted along the y-axis in dependence on the wavelength in nm along the x-axis.

For such a system the spectrum can be determined in dependence on the greyscale values $g_r$, $g_g$ and $g_b$ as follows:

$$S_{1DMD}(\lambda, g_r, g_g, g_b) = \int_{frame} dt \Sigma_{colours} \quad c \in (r,g,b) I(\lambda) \cdot T_T(c,\lambda) \cdot D_1(t, \lambda, g_r, g_g, g_b) \cdot T_O(\lambda) \quad (10)$$

The spectrum for $D_1$ can correspond to that for the ON state or to that for the OFF state, depending on the chosen greyscale values for the individual colors.

Figure 10:
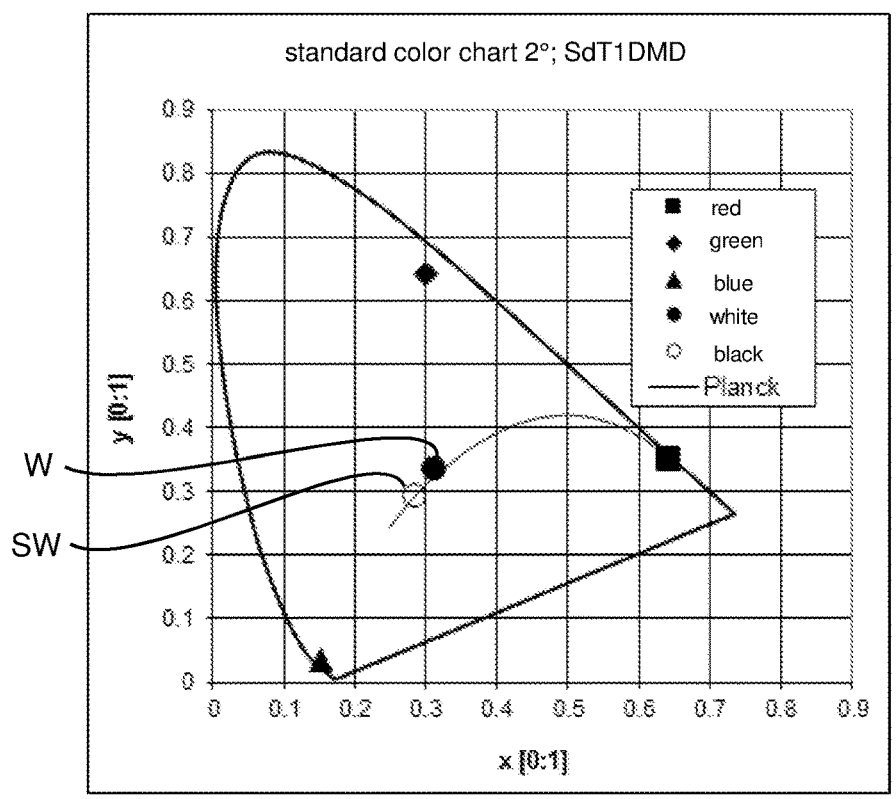
FIG. 10 is the resulting color space of the projector 101 according to FIG. 5 in a standard color chart of the CIE standard valence system.

With the aid of the formulae depicted above, the spectrum can be determined for the individual colors and, from this, the color locations. The resulting color space of the projector 101 with single modulation is represented in FIG. 10 in a standard color chart (for an observer looking onto a 2° field of view) of the CIE standard valence system, wherein the color space of the projector 101 covers all color locations in a triangle with the vertices red, green and blue. In addition, in FIG. 10 the curve of the radiation of a black body (labelled Planck) is also drawn in. If it is assumed that the proportions of the red, green and blue segments are 41%, 29% and 30%, the drawn-in white point W results. In addition, the color location SW, which results when the modulator 105 is on black (OFF state) for the entire time of a frame, is plotted.

Figure 11:
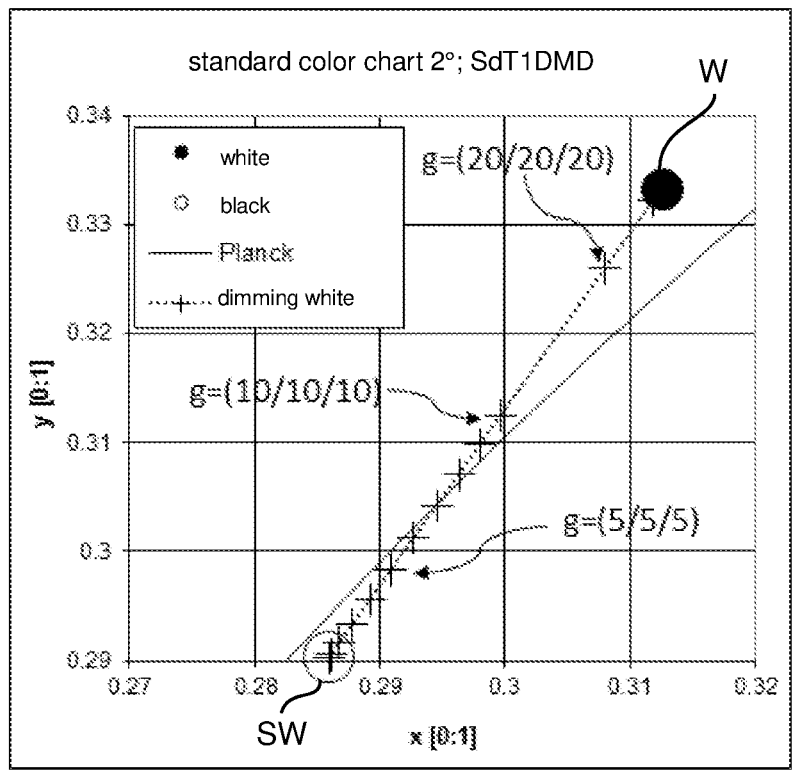
FIG. 11 is an enlarged representation of a section of the representation according to FIG. 10.

With the specified formulae the color locations and lightnesses that result for a dimming of the white triple (255/255/255) can be calculated. Ideally, the color location does not change during dimming. In the case of white (255/255/255) the color location should always be the white point. In FIG. 11, from the color space from FIG. 10, the range for $0.29 \leq y \leq 0.34$ and $0.27 \leq x \leq 0.32$ is represented enlarged, wherein the color locations for the grey triple for g (20/20/20) to g (0/0/0) (thus the white values dimmed to zero) are drawn in as a "+" sign. However, this reveals that the color deviation ($\Delta xy$) in x and y for a grey triple (20/20/20) is already greater than a typically assumed perception threshold of 0.003 (in the case of a gamma of 2.2; the formula for the gamma is indicated further below in the description, e.g. formula 15; $\Delta xy = \sqrt{x^2+y^2}$).

Figure 12:
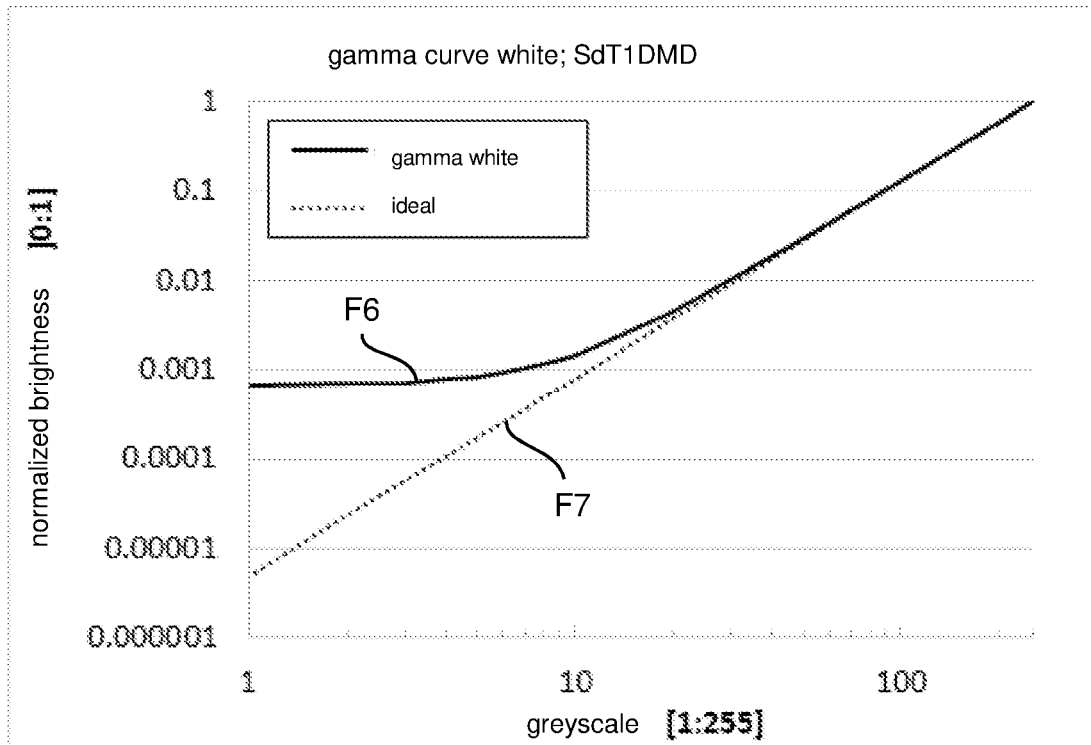
FIG. 12 is the progression of the gamma curve for the projector 101 according to FIG. 5.

FIG. 12 shows the lightnesses determined with the above formula for the exemplary projection system according to the state of the art as a $\gamma$ curve F6 (gamma curve F6) for white, wherein the greyscale values, which can adopt values from 1 to 255, are plotted along the x-axis and the lightness maximized to 1 is plotted along the y-axis. The gamma curve F6 is the continuous line and the ideal gamma curve F7 is drawn in as a dotted line.

The color locations shown g (20/20/20), g (10/10/10), g (5/5/5) for the dimming in FIG. 11 as well as the progression of the gamma curve F6 in FIG. 12 show that the projector 101 with single modulation is e.g. not suitable for a multi-projector arrangement, as an "invisible" overlapping of two edge regions of the projected images from two (or more) projectors is not possible.

Figure 13:
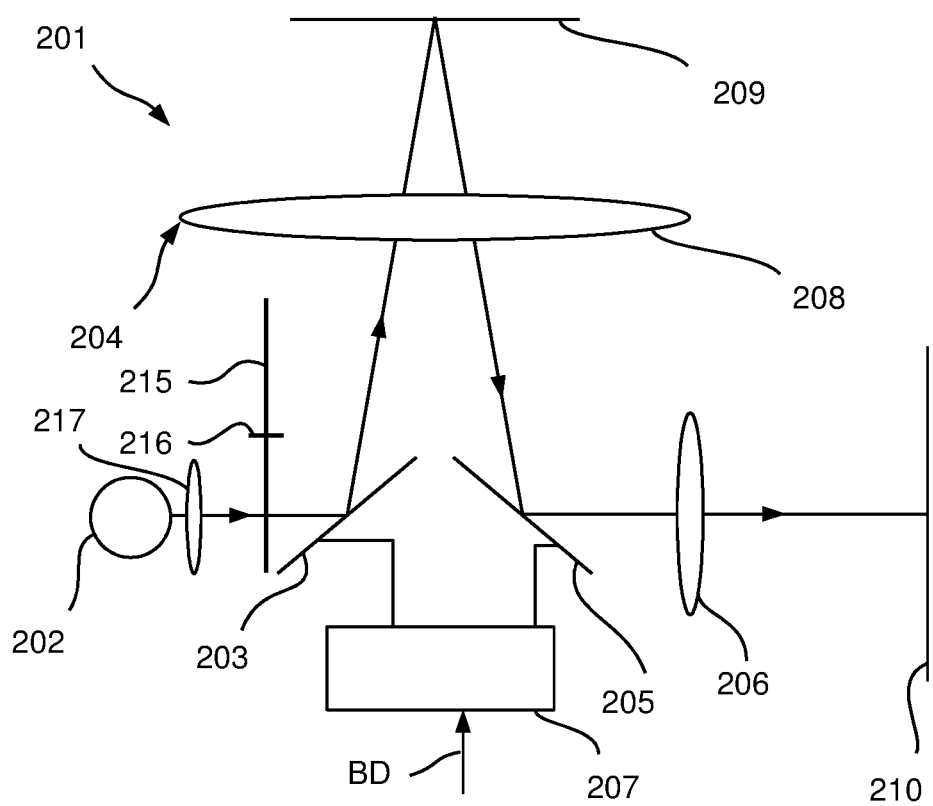
FIG. 13 is a representation of a known projector with double modulation.

Projector 201 with Double Modulation According to FIG. 13

When two series-connected modulators 203, 205 are used, as is the case with the projector 201 with double modulation in FIG. 13, the contrast increases.

The projector 201 (also called 2xDMD SdT in the following) is in principle constructed identically to the projector 1 in FIG. 1. Therefore, identical or similar elements are given reference numbers which are greater by 200 than the corresponding reference numbers in FIG. 1. Only the differences, which relate substantially to the control unit 207 and the actuation of the modulators 203, 205, are described below.

The spectrum $S(\lambda)$ after a double modulation by means of the projector 201 can be described as follows:

$$S(\lambda, g_1, g_2) = \int_\Omega d\Omega \int_{frame} dt \sum_{colours\ c \in (r,g,b)} I(\Omega, t, \lambda) \cdot T_B(\Omega, \lambda) \cdot T_C(\Omega, c, \lambda) \cdot D_1(\Omega, t, c, \lambda, g_1) \cdot T_Z(\Omega, \lambda) \cdot D_2(\Omega, t, c, \lambda, g_2) \cdot T_P(\Omega, \lambda) \quad (11)$$

With c color; for example red, green and blue (r, g, b)

g greyscale value which is represented on the first image generator 203, can be the triple for r, g, b $D_1(\Omega, t, c, \lambda, g_1)$ transmittance or reflectance of the first image generator 203

$I(\Omega, t, \lambda)$ intensity of the light source 202 t time variable $T_B(\Omega, \lambda)$ transmittance of the illumination optical system 217

$T_C(\Omega, c, \lambda)$ transmittance of all color splitters and combiners as well as color wheels 215

$T_P(\Omega, \lambda)$ transmittance of the projection optical system 206

$\lambda$ wavelength; for example 400 nm to 700 nm $\Omega$ solid angle $g_2$ greyscale value which is represented on the second image generator 205, can be the triple for r, g, b $D_2(\Omega, t, c, \lambda, g_2)$ transmittance or reflectance of the second image generator 205

$T_Z(\Omega, \lambda)$ transmittance of the intermediate imaging 204 between first and second modulator 203, 205

Here too, the angle dependence of the individual optical elements can typically be eliminated by using an average over the solid angle $\Omega$ in the calculations. Furthermore, the transmittances of the imaging optical systems (illumination, projection, intermediate imaging) can be combined into a single function: $T_O(\lambda)$ (already averaged over the solid angles). As a result:

$$S(\lambda, g_1, g_2) = \int_{frame} dt \sum_{c \in (r,g,b)} I(t,\lambda) \cdot T_O(\lambda) \cdot T_C(c,\lambda) \cdot D_1(t,c,\lambda,g_1) \cdot D_2(t,c,\lambda,g_2) \quad (12)$$

Analogously to the above statements about single modulation (formulae (3) to (9)), for the above-determined spectrum of a represented pixel, the color values $\vec{X}(g_1, g_2)$ and the color location $(x, y)(g_1, g_2)$ can be determined via the standard spectral value functions $\bar{x}(\lambda), \bar{y}(\lambda)$ and $\bar{z}(\lambda)$.

The spectra of the individual components have already been represented in the drawings of FIGS. 6 to 9. It was assumed that the two modulators 203, 205 have a contrast of 1500:1 in white.

Analogously to equation (2), the spectrum can generally be described in dependence on the greyscale values $g_{1r}, g_{1g}$ and $g_{1b}$ of the first modulator 203 and the greyscale values $g_{2r}, g_{2g}$ and $g_{2b}$ of the second modulator 205 after a double modulation as follows (the angle dependence from (1) has already been eliminated):

$$S_{double}(\lambda, g_{1r}, g_{1g}, g_{1b}, g_{2r}, g_{2g}, g_{2b}) = \int_{frame} dt \sum_{colours\ c \in (r,g,b)} I(\lambda) \cdot T_C(c, \lambda) \cdot D_1(t, \lambda, g_{1r}, g_{1g}, g_{1b}) \cdot D_2(t, \lambda, g_{2r}, g_{2g}, g_{2b}) \cdot T_O(\lambda) \quad (13)$$

For a double modulation according to the above-described example with two DMDs, the expression can be simplified to:

$$S_{2xDMD,SdT}(\lambda, t_{00,r}, t_{01,r}, t_{10,r}, t_{00,g}, t_{01,g}, t_{10,g}, t_{00,b}, t_{01,b}, t_{10,b}) = \quad (14)$$
$$\frac{1}{\tau_r + \tau_g + \tau_b} \cdot \sum_{c \in (r,g,b)} \tau_c \cdot I(\lambda) \cdot T_C(c, \lambda) \cdot T_O(\lambda) \cdot$$
$$\{t_{00,c} \cdot D_1(\lambda, \text{"black"}) \cdot D_2(\lambda, \text{"black"}) + t_{01,c} \cdot D_1(\lambda, \text{"black"}) \cdot D_2(\lambda, \text{"white"}) + t_{10,c} \cdot D_1(\lambda, \text{"white"}) \cdot D_2(\lambda, \text{"black"}) + (\tau_c - t_{00,c} - t_{01,c} - t_{10,c}) \cdot D_1(\lambda, \text{"white"}) \cdot D_2(\lambda, \text{"white"})\}$$

In the case of image generators 203, 205 with pulse-width modulation the time t during which a pixel transmits the light (ON state) in relation to the total time of a frame $\tau$ reveals what percentage of the light (for one color) reaches the screen 210. In the above formulae, "white" denotes the ON state and "black" denotes the OFF state of the corresponding pixel. Via the gamma value $\gamma$, a greyscale g can be allocated to such a time. For a representation in 8 bits, the following results:

$$g = 255 \cdot \left(\frac{t}{\tau}\right)^{1/\gamma} \quad (15)$$

For the two modulators $i \in \{1,2\}$ and the colors $c \in \{r, g, b\}$:

$$g_{i,c} = 255 \cdot \left(\frac{t_{i,c}}{\tau_c}\right)^{1/\gamma} \quad (16)$$

It is assumed that the frame time $\tau_c$ is the same for both DMDs.

Figure 14:
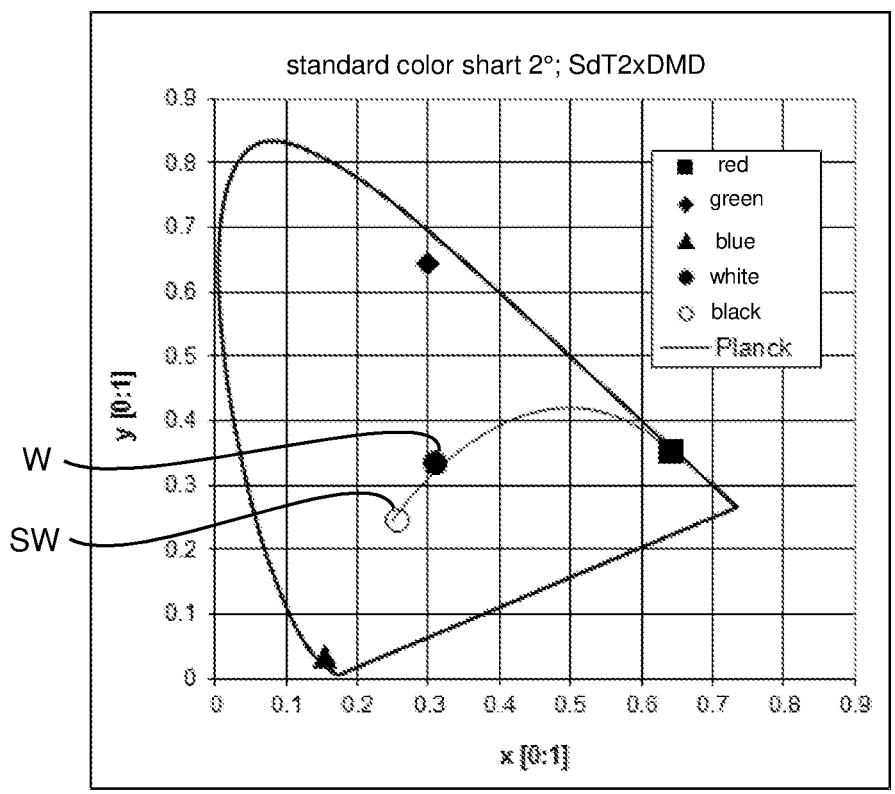
FIG. 14 is the resulting color space of the projector 201 according to FIG. 13 in the same way as in FIG. 10.

With the aid of the above-depicted formula (14) the spectrum can be determined for the individual colors and, from this, the color locations. In FIG. 14 the resulting color space is represented in the same way as in FIG. 10. If it is assumed that the proportions of the red, green and blue segments are 41%, 29% and 30%, the drawn-in white point W results. In addition, the color location SW, which results when the DMDs (or the corresponding pixel or pixels) are on black (OFF state) for the entire time of a frame, is plotted. To simplify the description, reference is only made to the modulators in the following. Of course, this always also relates to the individual pixels or tilting mirrors of the modulators.

In the case of a double modulation, per color c, both modulators 203, 205 can be switched to black for a time $t_{00,c}$; for a time $t_{01,c}$ the first modulator 203 can be switched to black and the second modulator 205 can be switched to white; for a time $t_{10,c}$, conversely, the first modulator 203 can be switched to white and the second modulator 205 can be switched to black; finally, for a time $t_{11,c}$ both modulators 203, 205 can be switched to white. Here:

$$t_{00,c} + t_{01,c} + t_{10,c} + t_{11,c} = \tau_c \text{ with } c \in \{r,g,b\} \quad (17)$$

In this example the first modulator 203 serves to illuminate the second modulator 205. This means that the (first) illumination modulator 203 always provides light when the (second) imaging modulator 205 requires light. As a result $t_{01,c} = 0$ for all colors. Furthermore, the illumination modulator 203 should transmit light as infrequently as possible when the imaging modulator 205 is on black ($t_{10,c} \ll \tau_c$). For a fixed (constant) time, for example, the illumination modulator 203 can be on white for longer than the imaging modulator 205; alternatively, the illumination modulator 203 can be switched between black and white at fixed times (with the result that in turn the required illumination of the imaging modulator 205 is covered). In this example $$t_{10,c} = \min\{0.012 \cdot \tau_c; \tau_c - \tau_{11,c}\} \quad (18)$$

This takes account of a DMD with phased reset for the modulators 203, 205 and of an intermediate imaging, in which, although a pixel-to-pixel allocation is ensured, the reset zones of the two DMDs 203, 205 are not identical.

Furthermore, there is a functional relationship between the time $t_{10,c}$ for which the illumination modulator 203 is on white, when the imaging modulator 205 is on black; thus: $t_{10,c} = t_{10,c}(t_{11,c})$. The above expression is thus simplified to:

$$t_{00,c} + t_{10,c}(t_{11,c}) + t_{11,c} = \tau_c \text{ with } c \in \{r,g,b\} \quad (19)$$

Via formula (15) the times $t_{11,c}$ can thus be calculated (the corresponding pixels of both DMDs 203, 205 are on ON), which are necessary for a greyscale value (r, g, b) to be represented. The times during which only the first DMD 203 is on ON result from (17). The remaining time for a color (re) is calculated according to (18).

Equation (14) can thus be transformed to:

$$S_{2xDMD,SdT}(\lambda, t_{11,r}, t_{11,g}, t_{11,b}) = \quad (20)$$

$$\frac{1}{\tau_r + \tau_g + \tau_b} \cdot \sum_{c \in (r,g,b)} \tau_c \cdot I(\lambda) \cdot T_C(c, \lambda) \cdot T_O$$

$$(\lambda) \cdot \{(\tau_c - t_{11,c} - t_{10,c}(t_{11,c})) \cdot D_1(\lambda, \text{"black"}) \cdot D_2(\lambda, \text{"black"}) +$$

$$t_{10,c}(t_{11,c}) \cdot D_1(\lambda, \text{"white"}) \cdot D_2(\lambda, \text{"black"}) +$$

$$t_{11,c} \cdot D_1(\lambda, \text{"white"}) \cdot D_2(\lambda, \text{"white"})\}$$

Here $T_C(c, \lambda)$ describes the transmittance through the different filters c of the color wheel and the states "black" and "white" correspond to the black and, respectively, white state of the two DMDs.

Figure 15:
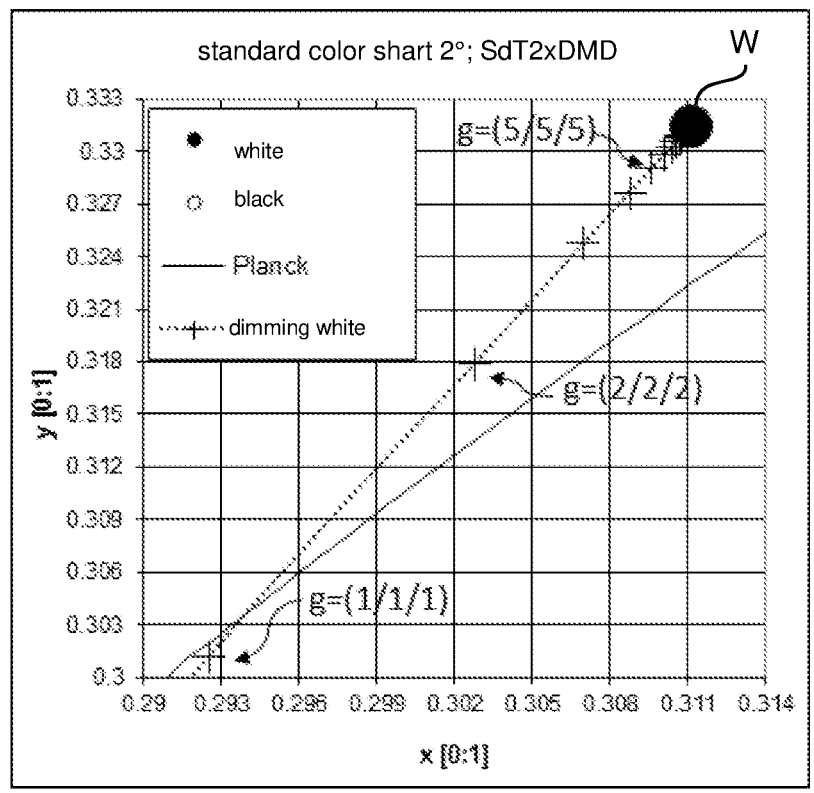
FIG. 15 is an enlarged representation of a section of the color space according to FIG. 14.
Figure 16:
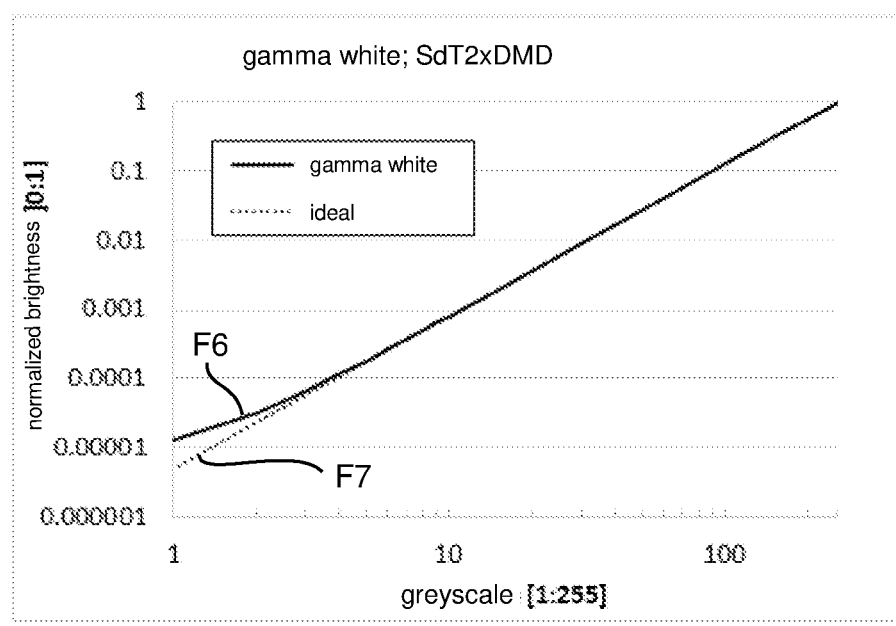
FIG. 16 is the gamma curve for the projector 201 according to FIG. 13.
Figure 17:
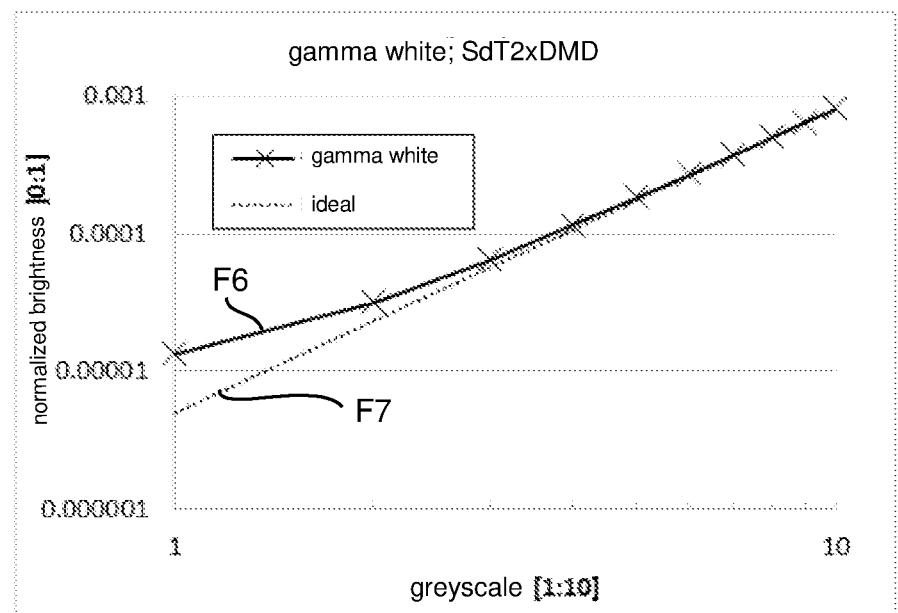
FIG. 17 is an enlarged representation of the representation from FIG. 16 for the greyscale range from 1 to 10.

With the indicated formula (19), the color locations and lightnesses that result for a dimming of the white triple (255/255/255) can be calculated. In FIG. 15 the range for $0.333 \leq y \leq 0.3$ and $0.29 \leq x \leq 0.314$ from the color space from FIG. 14 is represented enlarged, wherein the color locations for the grey triples (5/5/5) to (1/1/1) are drawn in. It is clear from this representation that the color deviations (thus the changes in the color location) are much smaller than in the case of a single modulation (comparison with FIG. 11). Only in the case of a grey triple of (5/5/5) are the color deviations in x and y in the case of the modulator 201 with double modulation greater than a typically adopted perception threshold of 0.003 (in the case of a gamma of 2.2). FIG. 16 shows, for the modulator 201 with double modulation, in the same way as in FIG. 12, that the ideal gamma curve F7 is found much better in the case of the modulator 201 with double modulation (curve F6) than in the case of a single modulation. The deviations for dark greyscales, however, are still significant, as can be seen from FIG. 17, in which, in the same way as in FIG. 16, the gamma curves F6, F7 for white for the greyscale values of from 1 to 10 are shown.

For both examples according to the state of the art the resulting color locations and lightnesses are summarized in the following table:

| RGB input | | | Ideal | 1xDMD SdT | | | 2xDMD SdT | | |
|---|---|---|---|---|---|---|---|---|---|
| R | G | B | L | L | x | y | L | x | y |
| 255 | 255 | 255 | 1 | 1 | 0.313 | 0.333 | 1 | 0.311 | 0.331 |
| 20 | 20 | 20 | 0.00370 | 0.00436 | 0.308 | 0.326 | 0.00371 | 0.311 | 0.331 |
| 10 | 10 | 10 | 0.00080 | 0.00147 | 0.300 | 0.312 | 0.00081 | 0.311 | 0.331 |
| 9 | 9 | 9 | 0.00064 | 0.0013 | 0.298 | 0.310 | 0.00065 | 0.311 | 0.331 |
| 8 | 8 | 8 | 0.00049 | 0.00116 | 0.296 | 0.307 | 0.00050 | 0.311 | 0.331 |
| 7 | 7 | 7 | 0.00037 | 0.00103 | 0.295 | 0.304 | 0.00038 | 0.310 | 0.330 |
| 6 | 6 | 6 | 0.00026 | 0.00093 | 0.293 | 0.301 | 0.00027 | 0.310 | 0.330 |
| 5 | 5 | 5 | 0.00018 | 0.00084 | 0.291 | 0.298 | 0.00018 | 0.310 | 0.329 |
| 4 | 4 | 4 | 0.00011 | 0.00077 | 0.289 | 0.296 | 0.00012 | 0.309 | 0.328 |
| 3 | 3 | 3 | 5.69E−05 | 0.00072 | 0.288 | 0.293 | 6.535E−05 | 0.307 | 0.325 |
| 2 | 2 | 2 | 2.33E−05 | 0.00069 | 0.287 | 0.292 | 3.176E−05 | 0.303 | 0.318 |
| 1 | 1 | 1 | 5.08E−06 | 0.00067 | 0.286 | 0.291 | 1.35E−05 | 0.293 | 0.301 |
| 0 | 0 | 0 | 0 | 0.00067 | 0.286 | 0.290 | 4.45E−07 | 0.259 | 0.242 |

This table shows a summary of the color locations and lightnesses for the two example systems 101, 201 according to the state of the art in dependence on predefined RGB input values.

For the color-correct representation of dark image contents it is necessary—e.g. in multi-projector arrangements—both for the color locations to be preserved over a dimming and for the lightnesses to be as close as possible to the ideal gamma curve.

The described difficulty of representing correct lightnesses for low lightnesses can be overcome with a so-called "boosting", in which one of the two modulators 3, 5 is switched to black and the second modulator only modulates an unavoidable residual light of the modulator switched to black, advantageously such that low lightness values can be generated more precisely. This residual light furthermore has a spectral characteristic which depends on the respective projector 1. According to the invention, therefore, the residual light will modulate such that the correct colors are also reproduced at the same time as the correct lightness.

The projector 1 can be allocated a so-called "black point" SW. The black point describes the color location for a black image. The color locations of white point W and black point SW are typically not identical in the case of a real projector. While the white point W (as a rule) results from the primary colors (from the sum of the corresponding color values), the black point SW results from the finite contrast of the image generators 3, 5. This contrast is wavelength-dependent as a rule. In the case of image generators 3, 5 based on liquid crystals, the contrast is typically smaller in the blue than in the red, with the result that the black point SW is usually "bluer" than the white point. For tilting mirror matrices 3, 5, such as are used in the projector 1 according to FIG. 1, the contrast is influenced by the surface area under the tilting mirrors as well as by the mirror edges. Here too, as a rule, more blue light than red reaches the projection surface 10.

Because of these properties, the color location of each projected color shifts in an undesired manner in the direction of the black point SW during dimming. Even "pure" colors—such as red, green or blue—have a color location, e.g. in the case of a greyscale of 1, which no longer corresponds to the primary color, but is already close to the black point.

When one of the modulators 3, 5 (e.g. the first modulator 3) is switched to black, as the resulting spectrum the following results from (13):

$$S_{double+boost}(\lambda, g_{2r}, g_{2g}, g_{2b}) = \int_{frame} dt \Sigma_{colours\ c\in(r,g,b)} I(\lambda) \cdot T_C(c,\lambda) \cdot D_1(\lambda, \text{"black"}) \cdot D_2(t,\lambda,g_{2r},g_{2g},g_{2b}) \cdot T_O(\lambda) \quad (21)$$

The resulting color values can be determined analogously to the equations (3) to (6) here as well:

$$\vec{X}_{double+boost}(g_{2r}, g_{2g}, 2_{2b}) = \begin{pmatrix} \int_\lambda d\lambda S_{double+boost}(\lambda, g_{2r}, g_{2g}, 2_{2b}) \cdot \bar{x}(\lambda) \\ \int_\lambda d\lambda S_{double+boost}(\lambda, g_{2r}, g_{2g}, 2_{2b}) \cdot \bar{y}(\lambda) \\ \int_\lambda d\lambda S_{double+boost}(\lambda, g_{2r}, g_{2g}, 2_{2b}) \cdot \bar{z}(\lambda) \end{pmatrix}$$

$$= \begin{pmatrix} X_{double+boost}(g_{2r}, g_{2g}, 2_{2b}) \\ Y_{double+boost}(g_{2r}, g_{2g}, 2_{2b}) \\ Z_{double+boost}(g_{2r}, g_{2g}, 2_{2b}) \end{pmatrix} \quad (22)$$

The values $g_{2r}$, $g_{2g}$ and $g_{2b}$, which approximate a target color value $\vec{X}_{target}$ as precisely as possible, are now sought. Therefore, $g_{2r}, g_{2g}, g_{2b} \in [0, 1, \ldots, 255]$ is determined such that $\|\vec{X}_{target} - \vec{X}_{double+boost}(g_{2r}, g_{2g}, g_{2b})\|$ becomes minimal. In the case of a predefined RGB triple (or image data BD) of a (dark) picture element (which has e.g. a lightness value which is smaller than a first threshold value) of an image to be represented, the control unit 7 therefore sets the signal (illumination control data BS) for the first image generator 3 to black and determines the color triple $g_{2r}$, $g_{2g}$ and $g_{2b}$ and, from this, the image control data BD for the second modulator 5 such that the color distance from the predefined RGB triple (or from the image data BD) becomes minimal.

Here $\|\cdot\|$ is a norm which describes the distance between two color values. This norm can be defined, for example, as a magnitude or an absolute value of the color vector. Alternatively, the vectors $\vec{L}_{double+boost}(g_{2r}, g_{2g}, g_{2b})$ and $\vec{L}_{target}$ are first calculated according to formula (9) and then the norm of the difference vector is in turn found. This norm $\|\|\vec{L}\|\|$ can evaluate the individual components of the vector differently:

$$\|\|\vec{L}\|\| = \left\|\left\| \begin{pmatrix} L_1 \\ L_2 \\ L_3 \end{pmatrix} \right\|\right\| := \sqrt{\alpha \cdot (L_1)^2 + \beta \cdot (L_2)^2 + \gamma \cdot (L_3)^2} \quad (23)$$

In order, for example, to weight the lightness ($L_1$) of a represented color differently from the color location ($L_2$ and $L_3$), $\alpha \neq 1$ and $\beta = \gamma = 1$ can be chosen. Furthermore, for $L_2$ and $L_3$, deviating from (9), instead of the xy color coordinates, u'v' color coordinates according to DIN EN ISO 11664-1 can also be used.

For the image modulation with the two modulators 3, 5 with pulse-width modulation (PWM), thus $t_{10,c} = t_{11,c} = 0$ in equation (14) and the following results for equation (17):

$$t_{00,c} + t_{01,c} = \tau_c \text{ with } c \in \{r,g,b\} \quad (24)$$

Formula (14) is then simplified to:

$$S_{2xDMD}(\lambda, t_{01,r}, t_{01,g}, t_{01,b}) = \quad (25)$$

$$\frac{1}{\tau_r + \tau_g + \tau_b} \cdot \sum_{c\in(r,g,b)} \tau_c \cdot I(\lambda) \cdot T_C(c,\lambda) \cdot T_O$$

$$(\lambda) \cdot \{(\tau_c - t_{10,c}) \cdot D_1(\lambda, \text{"black"}) \cdot D_2(\lambda, \text{"black"}) + t_{01,c} \cdot D_1(\lambda, \text{"black"}) \cdot D_2(\lambda, \text{"white"})\}$$

The times $t_{01,r}$, $t_{01,g}$, $t_{01,b}$, which make it possible to represent a sought value for $\vec{X}_{target}$, are now sought. Using the equations (3) to (6), the above equation can be transformed to the following requirement:

Find $t_{01,c} \in [0: \tau_c]$ with $c \in \{r, g, b\}$, with the result that $\|\vec{X}_{target} - \vec{X}_{2xDMD}(t_{01,r}, t_{01,g}, t_{01,b})\|$ becomes minimal, with $$\vec{X}_{2xDMD}(t_{01,r}, t_{01,g}, t_{01,b}) = \quad (26)$$

$$\frac{1}{\tau_r + \tau_g + \tau_b} \cdot \sum_{c\in(r,g,b)} \{(\tau_c - t_{01,c}) \cdot \vec{X}_{00,c} + t_{01,c} \cdot \vec{X}_{01,c}\}$$

Here $$\vec{X}_{00,c} = \frac{\tau_c}{\tau_r + \tau_g + \tau_b} \int d\lambda\ I(\lambda) \cdot \quad (27)$$

$$T_C(c,\lambda) \cdot D_1(\lambda, \text{"black"}) \cdot D_2(\lambda, \text{"black"}) \cdot T_O(\lambda) \cdot \begin{pmatrix} \bar{x}(\lambda) \\ \bar{y}(\lambda) \\ \bar{z}(\lambda) \end{pmatrix}$$

-continued $$\vec{X}_{01,c} = \frac{\tau_c}{\tau_r + \tau_g + \tau_b} \int d\lambda \, I(\lambda) \cdot T_C(c, \lambda) \cdot \qquad (28)$$

$$D_1(\lambda, \text{"black"}) \cdot D_2(\lambda, \text{"white"}) \cdot T_O(\lambda) \cdot \begin{pmatrix} \bar{x}(\lambda) \\ \bar{y}(\lambda) \\ \bar{z}(\lambda) \end{pmatrix}$$

These vectors $\vec{X}_{00,c}$ and $\vec{X}_{01,c}$ are variables which can be determined, for example, experimentally for the projector 1.

If the spectra for lamp, DMDs, optical system and color filters, such as were applied in the case of the projector 201 with double modulation according to the state of the art, are used, then the times $t_{01,r}$, $t_{01,g}$, $t_{01,b}$ can be calculated, for which given target colors can be projected. The times can be converted into greyscale values (=On time duration of the corresponding pixel of the second modulator 5) of the respective colors via equation (16). As a rule, no natural numbers between 0 and 255 result here. Here, either the next natural numbers are to be chosen as $g_{2r}$, $g_{2g}$, $g_{2b}$ for the second modulator (or the next representable greyscale value, if the modulator has a higher bit depth than 8 bits). Alternatively, the necessary greyscale value can be represented via a spatial and/or temporal dithering.

For the example, the calculated greyscale values on the two modulators are summarized in the following table in dependence on RGB input values: again, an 8-bit representation is used as starting point here, wherein R1, G1, B1 are the ON times of the first modulator 3 for the respective color and R2, G2, B2 are the ON times of the second modulator 5 for the respective color.

input of (7/7/7), the corresponding pixel of the first modulator 3 is switched to black or OFF with (0/0/0) and the corresponding pixel of the second modulator 5, in contrast, is greatly increased or boosted (83.1/70.5/33.9) (or (83/71/34) rounded to whole numbers), which is much greater than the RGB input value (7/7/7). Thus, for these pixels the second modulator 5 modulates the unavoidable residual light of the first modulator 3. For colors which are not "too close" to the primary colors, $\|\vec{X}_{target} - \vec{X}_{2xDMD} (t_{01,r}, t_{01,g}, t_{01,b})\| = 0$ can be satisfied. This is the case when the matrix equation leads to solutions for $t_{01,c} \in [0, \tau_c]$. This becomes clear when the requirement is transformed to:

$$\frac{1}{\tau_r + \tau_g + \tau_b} \cdot \left( \vec{X}_{01,r} - \vec{X}_{00,r} \quad \vec{X}_{01,g} - \vec{X}_{00,g} \quad \vec{X}_{01,b} - \vec{X}_{00,b} \right)^T \cdot \qquad (29)$$

$$\begin{pmatrix} t_{01,r} \\ t_{01,g} \\ t_{01,b} \end{pmatrix} = \vec{X}_{target} - \frac{1}{\tau_r + \tau_g + \tau_b} \cdot \sum_{c \in (r,g,b)} \tau_c \cdot \vec{X}_{00,c}$$

This expression can be inverted and gives the solutions for the times $t_{01,r}$, $t_{01,g}$, $t_{01,b}$:

$$\begin{pmatrix} t_{01,r} \\ t_{01,g} \\ t_{01,b} \end{pmatrix} = \hat{M}^{-1} \cdot \vec{X} \qquad (30)$$

With

| RGB input | | | Ideal | 2xDMD + Boost | | | | | | | | | | | |
|---|---|---|---|---|---|---|---|---|---|---|---|---|---|---|---|
| R | G | B | L | R1 | G1 | B1 | R2 | G2 | B2 | t01r/τr | t01g/τg | t01b/τb | L | x | y |
| 255 | 255 | 255 | 1 | 255 | 255 | 255 | 255 | 255 | 255 | | | | 1 | 0.311 | 0.331 |
| 20 | 20 | 20 | 0.00370 | 20.1 | 20.1 | 20.1 | 20 | 20 | 20 | | | | 0.00371 | 0.311 | 0.331 |
| 10 | 10 | 10 | 0.00080 | 10.1 | 10.1 | 10.1 | 10 | 10 | 10 | | | | 0.00081 | 0.311 | 0.331 |
| 9 | 9 | 9 | 0.00064 | 9.05 | 9.05 | 9.05 | 9 | 9 | 9 | | | | 0.00065 | 0.311 | 0.331 |
| 8 | 8 | 8 | 0.00049 | 0 | 0 | 0 | 158.7 | 134.7 | 64.7 | 0.8062 | 0.7481 | 0.5362 | 0.00050 | 0.311 | 0.331 |
| 7 | 7 | 7 | 0.00037 | 0 | 0 | 0 | 83.1 | 70.5 | 33.9 | 0.6008 | 0.5575 | 0.3994 | 0.00037 | 0.311 | 0.331 |
| 6 | 6 | 6 | 0.00026 | 0 | 0 | 0 | 39.4 | 33.4 | 16.0 | 0.4278 | 0.3970 | 0.2843 | 0.00026 | 0.311 | 0.331 |
| 5 | 5 | 5 | 0.00018 | 0 | 0 | 0 | 16.3 | 13.8 | 6.6 | 0.2863 | 0.2656 | 0.1900 | 0.00018 | 0.311 | 0.331 |
| 4 | 4 | 4 | 0.00011 | 0 | 0 | 0 | 5.5 | 4.7 | 2.2 | 0.1750 | 0.1623 | 0.1159 | 0.00011 | 0.311 | 0.331 |
| 3 | 3 | 3 | 5.69E−05 | 0 | 0 | 0 | 1.4 | 1.2 | 0.5 | 0.0926 | 0.0859 | 0.0611 | 5.77E−05 | 0.311 | 0.331 |
| 2 | 2 | 2 | 2.33E−05 | 0 | 0 | 0 | 0.2 | 0.2 | 0.1 | 0.0376 | 0.0348 | 0.0245 | 2.36E−05 | 0.311 | 0.331 |
| 1 | 1 | 1 | 5.08E−06 | 0 | 0 | 0 | 0.006 | 0.005 | 0.002 | 0.0077 | 0.0071 | 0.0046 | 5.14E−06 | 0.311 | 0.331 |
| 0 | 0 | 0 | 0 | 0 | 0 | 0 | 0 | 0 | 0 | 0 | 0 | 0 | 4.45E−07 | 0.259 | 0.242 |

Figure 18:
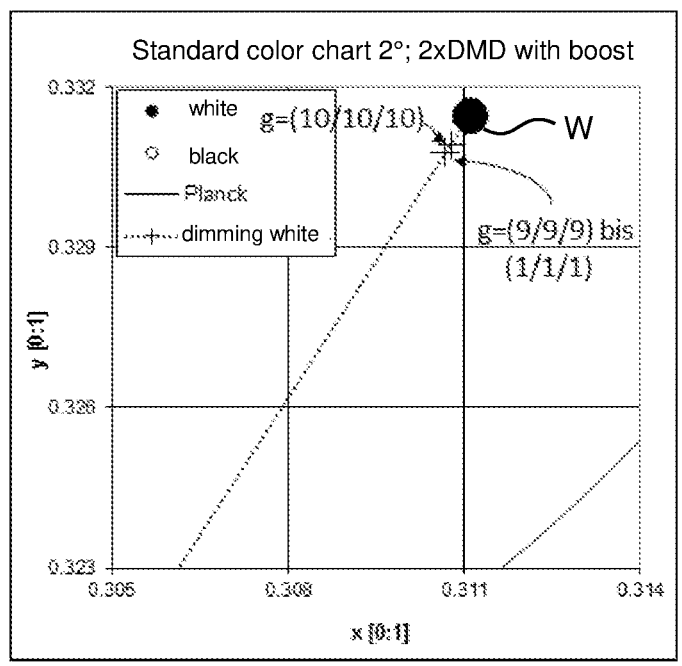
FIG. 18 is a section from the color space for the projector according to the invention in the same way as the representation from FIG. 10.
Figure 19:
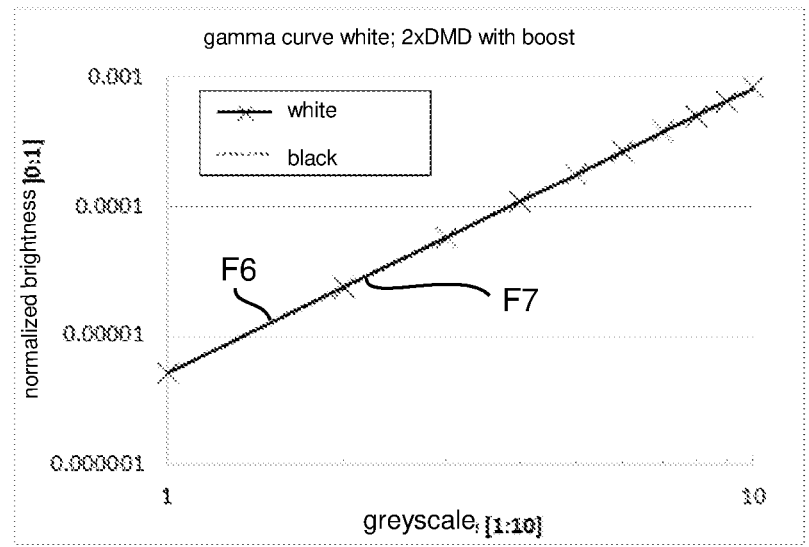
FIG. 19 is the gamma curve for the projector according to the invention.

It is shown that, compared with the solutions according to the state of the art, the color locations vary less or deviate from the ideal value less (in the example the coordinates of the last unboosted color (9/9/9) were used as target color). In FIG. 18 this is represented in the same way as in FIG. 11 and FIG. 15 for the grey triples (10/10/10) to (1/1/1). This reveals that the grey triples (9/9/9) to (1/1/1) lie at the same color location and the grey triple (10/10/10) lies very close to this color location, with the result that the color deviations lie below a perception threshold of 0.003. Furthermore, the lightnesses according to the ideal gamma curve F7 are additionally found much better, as is shown in FIG. 19 in the same way as in FIGS. 11, 16 and 17. Thus the gamma curve F6 drawn with a continuous line for white for the greyscale values of from 1 to 10 lies on the ideal in gamma curve F7, which is shown as a dotted line. The "boosting" carried out for this can likewise be seen in this table. For e.g. an RGB -continued $$\hat{M} = \qquad (31)$$

$$\frac{1}{\tau_r + \tau_g + \tau_b} \cdot \left( \vec{X}_{01,r} - \vec{X}_{00,r} \quad \vec{X}_{01,g} - \vec{X}_{00,g} \quad \vec{X}_{01,b} - \vec{X}_{00,b} \right)^T \text{ and }$$

$$\vec{X} = \vec{X}_{target} - \frac{1}{\tau_r + \tau_g + \tau_b} \cdot \sum_{c \in (r,g,b)} \tau_c \cdot \vec{X}_{00,c} \qquad (32)$$

The projector 1 according to the invention, because of the described time-sequential colored illumination of the two modulators 3, 5, comprises a red color channel, a green color channel and a blue color channel, wherein all color channels comprise the two modulators 3, 5 and the imaging optical system 4. They only differ by the position of the color wheel 15, which ensures that red, green or blue light strikes the modulators 3, 5. Each of these color channels, because of the described wavelength dependence of the contrast of the modulators 3, 5, has the undesired property that the generated color location shifts in dependence on the lightness set. This is disadvantageous precisely in the case of low lightness values to be generated and is compensated for according to the invention in the described manner.

Figure 20:
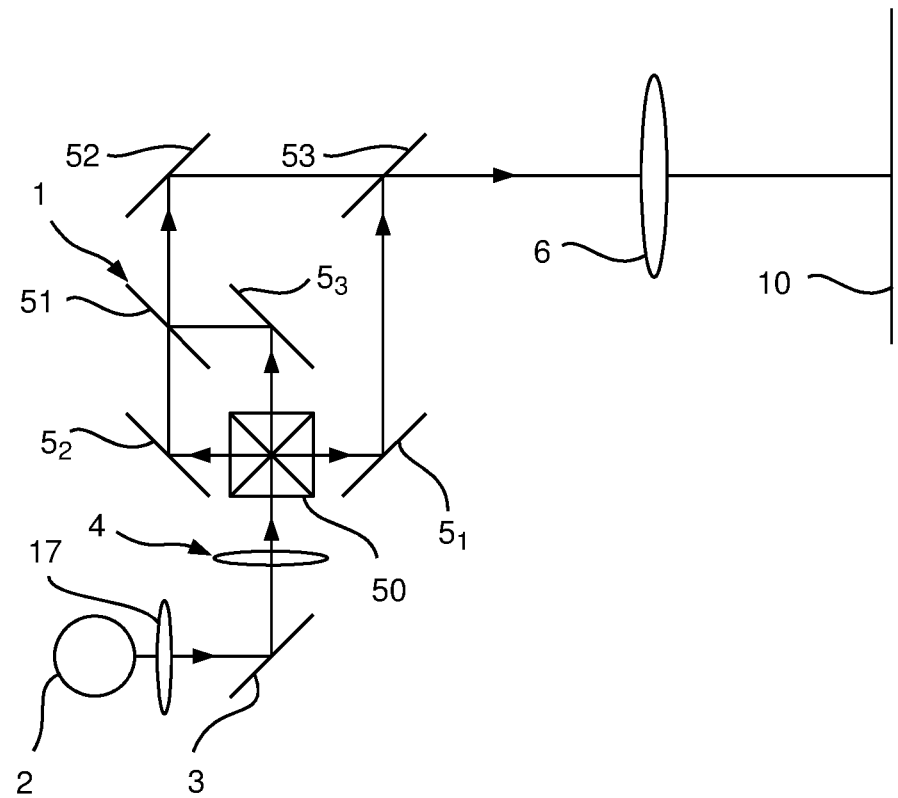
FIG. 20 is a further embodiment of the projector according to the invention.

In a second embodiment example of the projector 1, as shown in FIG. 20, the light is first deflected via a first modulator 3 ("illumination"). Then the light is split into a red, a green and a blue color portion by means of a color-splitting cube 50. The color portions are in each case deflected via a further modulator $5_1$, $5_2$, $5_3$ (the imaging modulator $5_1$ modulates the red color portion, the imaging modulator $5_2$ modulates the green color portion and the imaging modulator $5_3$ modulates the blue color portion). Then the modulated light is brought together via the mirrors 51, 52, 53 and deflected to a projection surface 10 via a projection optical system 6. In this example the modulators 3, $5_1$, $5_2$, $5_3$ are four DMDs. To simplify the representation, the control unit 7 is not drawn in.

In the case of such a "1→3" arrangement, equation (21) can be written as:

$$S_{1 \to 3}(\lambda, g_1, g_{2r}, g_{2g}, g_{2b}) = \int_{frame} dt I(\lambda) \cdot D_1(t, \lambda, g_1) \cdot T_O(\lambda) \cdot \sum_{colours\ c \in (r,g,b)} T_{C,c}(\lambda) \cdot D_{2c}(t, \lambda, g_{2c}) \quad (33)$$

Here, in $T_{C,c}(\lambda)$ let the transmittance for the color channel $c \in (r, g, b)$ be inclusive of the color splitters 50 and color combiners 51-53. $D_{2c}(t, \lambda, g_{2c})$ describes the reflectances of the three imaging DMDs $5_1$-$5_3$.

For the representation of light image contents, the illumination DMD 3 must be on white at least at those times when one of the imaging DMDs $5_1$-$5_3$ is on white. In particular in darker scenes, this has the result that the primary colors—or very colorful image contents—are desaturated of color.

For the representation of dark image contents, as already in the first embodiment example, a boosting can be carried out, wherein e.g. the illumination DMD 3 is set to black and the boosting is effected via the three imaging DMDs $5_1$-$5_3$.

If equation (29) is written in a representation with DMD times, then for the representation of dark image contents by means of boosting (analogously to (25) in the first embodiment example):

$$S_{1 \to 3DMD}(\lambda, t_{01,r}, t_{01,g}, t_{01,b}) = \quad (34)$$

$$\frac{1}{\tau} \cdot I(\lambda) \cdot T_O(\lambda) \cdot D_1(\lambda, \text{"black"}) \cdot \sum_{c \in (r,g,b)} T_{C,c}(\lambda) \cdot$$

$$\{(\tau - t_{01,c}) \cdot D_{2c}(\lambda, \text{"black"}) + t_{01,c} \cdot D_{2c}(\lambda, \text{"white"})\}$$

Here $\tau = \tau_r = \tau_g = \tau_b$.

The times $t_{01,r}$, $t_{01,g}$, $t_{01,b}$, which make it possible to represent a sought value for $\vec{X}_{target}$, are now sought again. Using the equations (3) to (6), the above equation can be transformed to the following requirement:

Find $t_{01,c} \in [0: \tau c]$ with $c \in \{r, g, b\}$, with the result that $\| \vec{X}_{target} - \vec{X}_{1 \to 3DMD}(t_{01,r}, t_{01,g}, t_{01,b})\|$ becomes minimal, with $$\vec{X}_{1 \to 3DMD}(t_{01,r}, t_{01,g}, t_{01,b}) = \quad (35)$$

$$\frac{1}{\tau} \cdot \sum_{c \in (r,g,b)} \{(\tau_c - t_{01,c}) \cdot \vec{X}_{00,c} + t_{01,c} \cdot \vec{X}_{01,c}\}$$

Here $$\vec{X}_{00,c} = \int d\lambda \, I(\lambda) \cdot T_O(\lambda) \cdot \quad (36)$$

$$D_1(\lambda, \text{"black"}) \cdot D_{2c}(\lambda, \text{"black"}) \cdot T_{C,c}(\lambda) \cdot \begin{pmatrix} \bar{x}(\lambda) \\ \bar{y}(\lambda) \\ \bar{z}(\lambda) \end{pmatrix}$$

$$\vec{X}_{01,c} = \int d\lambda \, I(\lambda) \cdot T_O(\lambda) \cdot \quad (37)$$

$$D_1(\lambda, \text{"black"}) \cdot D_{2c}(\lambda, \text{"white"}) \cdot T_{C,c}(\lambda) \cdot \begin{pmatrix} \bar{x}(\lambda) \\ \bar{y}(\lambda) \\ \bar{z}(\lambda) \end{pmatrix}$$

These vectors $\vec{X}_{00,c}$ and $\vec{X}_{01,c}$ are variables which can be determined, for example, experimentally for the projector 1.

Figure 21:
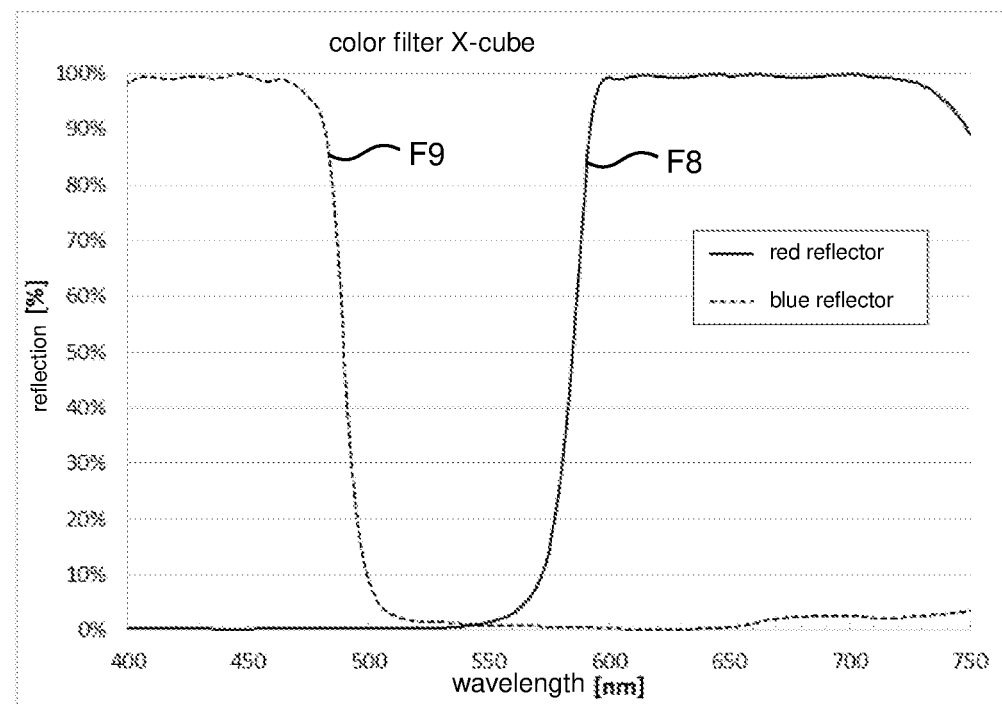
FIG. 21 is a representation of the reflection behaviour of the color-splitting cube 50 from FIG. 20.
Figure 22:
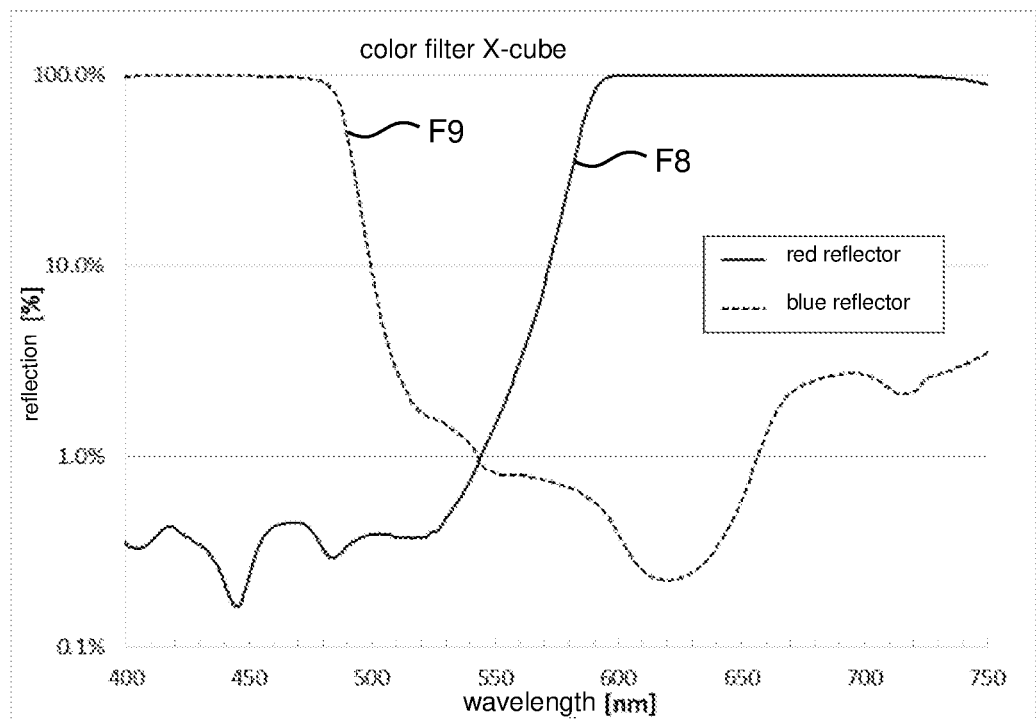
FIG. 22 is a further representation of the reflection behaviour of the color-splitting cube 50 from FIG. 20.

If the spectra for lamp, DMDs and optical system, such as were applied in the case of the projector 201 with double modulation according to the state of the art, are used again (the spectra of the color channels of the color-splitting cube 50 or of the X cube 50 are represented in FIGS. 21 and 22; $T_{C,c}(\lambda)$ can be calculated therefrom), then the times $t_{01,r}$, $t_{01,g}$, $t_{01,b}$ can be calculated, in order then to project the given target colors as precisely as possible. In FIGS. 21 and 22 the reflectance of the red reflector is drawn in as continuous line F8 and the reflectance of the blue reflector is drawn in as dotted line F9, wherein the wavelength in nm is plotted along the x-axis and the reflectance is plotted along the y-axis. The reflectance is plotted linearly in FIG. 21 and the reflectance is plotted logarithmically in FIG. 22.

The times can again be converted into greyscale values of the respective colors via equation (16). As a rule, no natural numbers between 0 and 255 result here. Here, either the next natural numbers are to be chosen as $g_{2r}$, $g_{2g}$, $g_{2b}$ for the second modulator $5_1$, $5_2$, $5_3$ (or the next representable greyscale value, if the modulator has a higher bit depth than 8 bits). Alternatively, the necessary greyscale value can be represented via a spatial and/or temporal dithering.

The thus-calculated greyscale values for the modulators 3, $5_1$, $5_2$, $5_3$ are summarized for white in FIG. 23 and for red in FIG. 24, in dependence on RGB input values. Here, a "1→3" arrangement without actuation according to the invention, which is called 1-3 DMD SdT, is compared with the projector 1 according to the invention according to FIG. 20, which is called 1-3 DMD+Boost.

Figure 25:
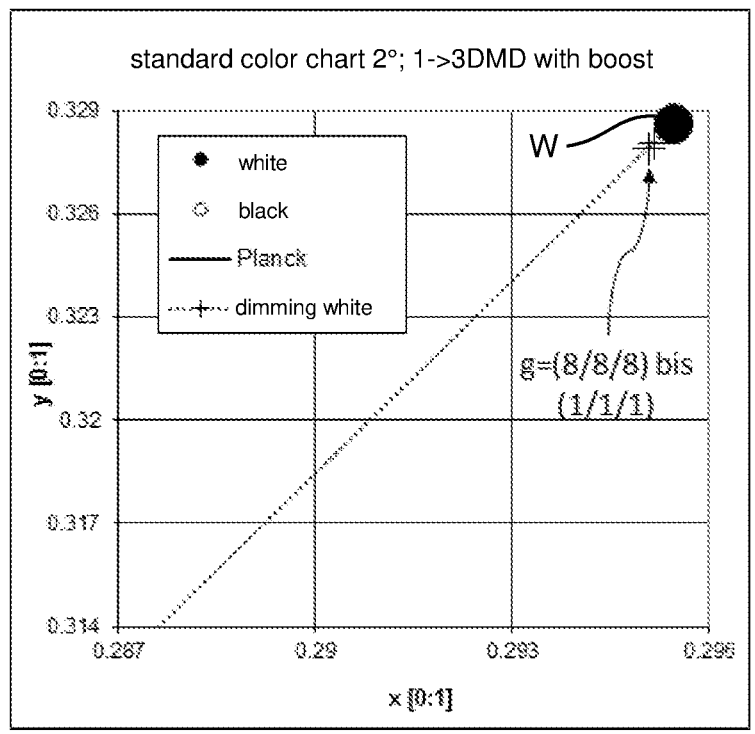
FIG. 25 is the representation of a section of the color space for the projector according to the invention.
Figure 26:
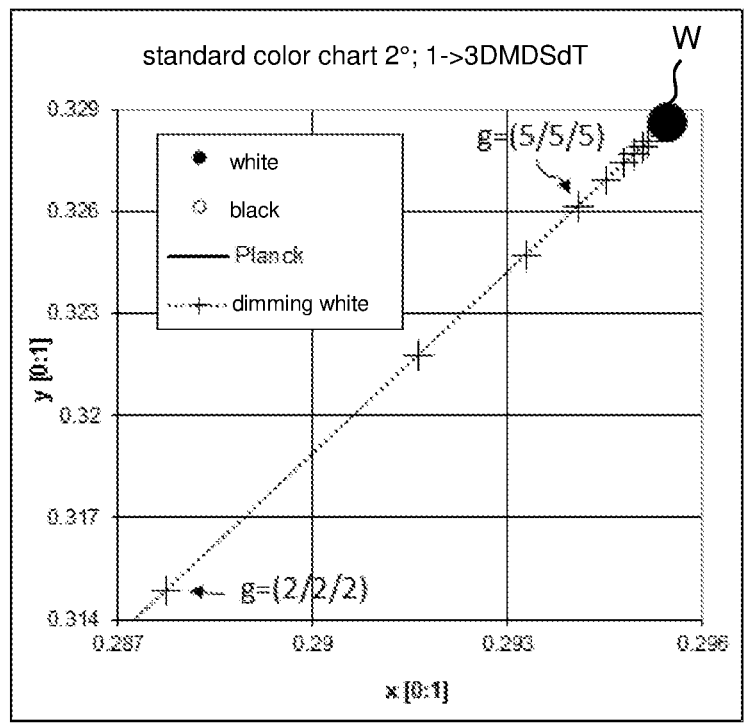
FIG. 26 is the representation of a color space of a known projector with double modulation for comparison with FIG. 25.
Figure 27:
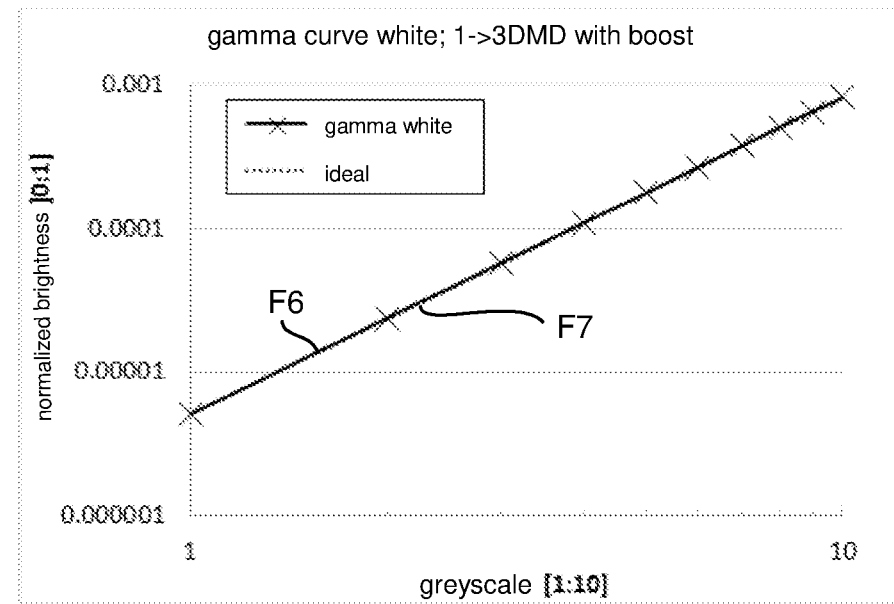
FIG. 27 is the progression of the gamma curve of the projector according to the invention.
Figure 28:
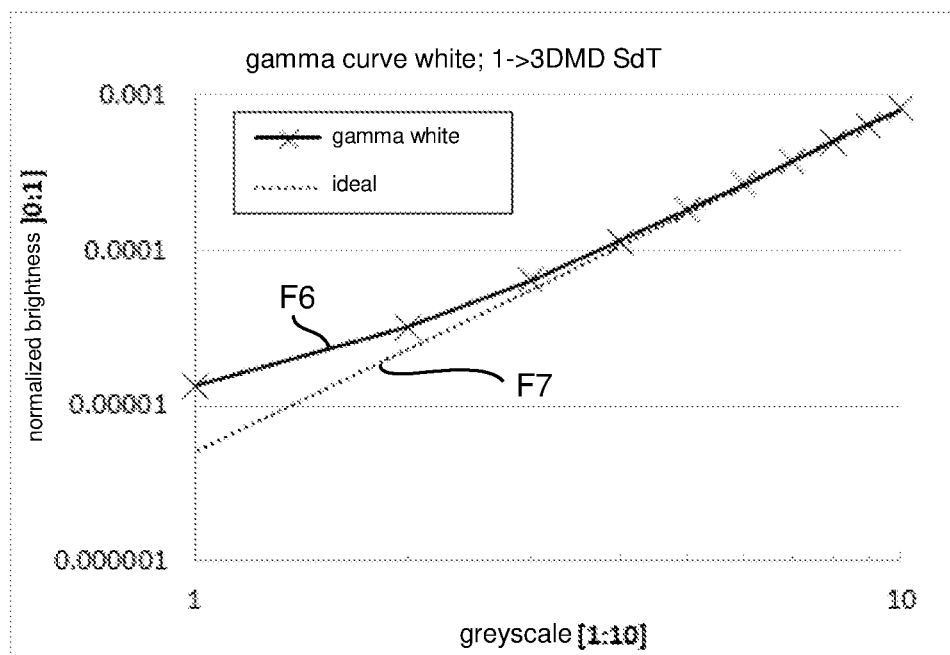
FIG. 28 is the progression of the gamma curve of a known projector with double modulation.

The stabilization of the color location in the case of the projector 1 according to the invention can also be seen from a comparison of the relevant region of the color space for the dimming from white (255/255/255) to black (0/0/0) for the projector 1 in FIG. 25 with the same region of the color space for a projector with "1→3" arrangement without the actuation according to the invention in FIG. 26. The representation in FIGS. 25 and 26 corresponds e.g. to the representation in FIG. 15. A comparison of the gamma curve for white according to FIG. 27 for the projector 1 according to the invention with the corresponding gamma curve for white for a "1-3" projector of the state of the art according to FIG. 28 for the greyscales 1 to 10 clearly shows how well the ideal gamma curve F7 is approximated with the projector 1 according to the invention. In FIGS. 27 and 28 the ideal gamma curves F7 are in each case represented dotted and the actually achieved gamma curves F6 are represented with a continuous line (in the same way as e.g. in FIG. 16).

Figure 29:
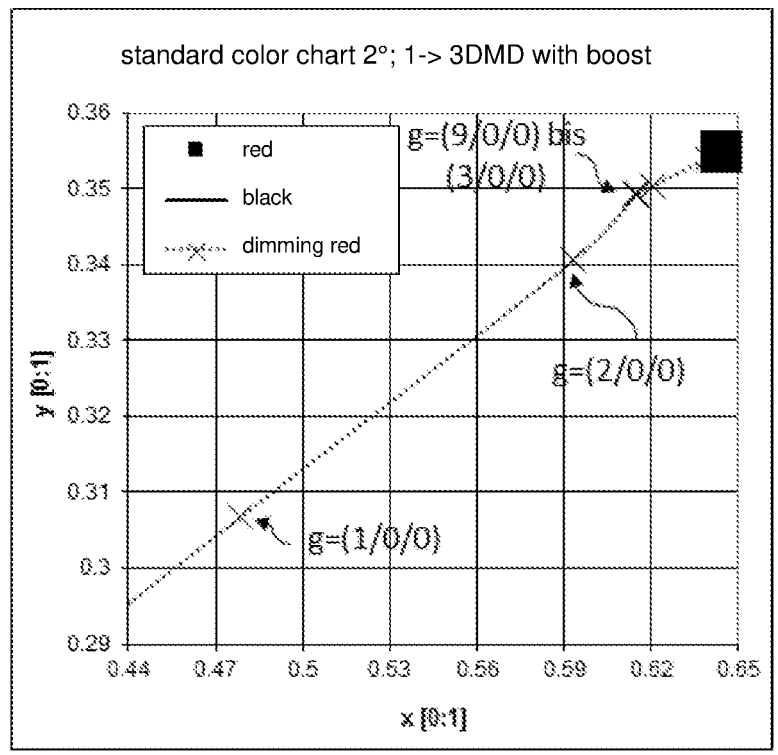
FIG. 29 is a section from the standard color chart for the projector according to the invention.
Figure 30:
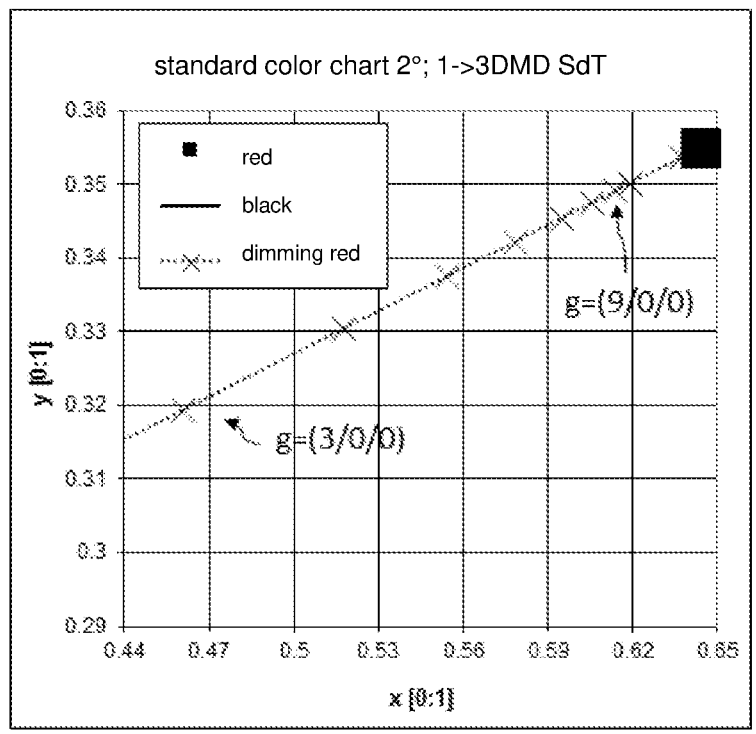
FIG. 30 is a section from the standard color chart for a known projector with double modulation.
Figure 31:
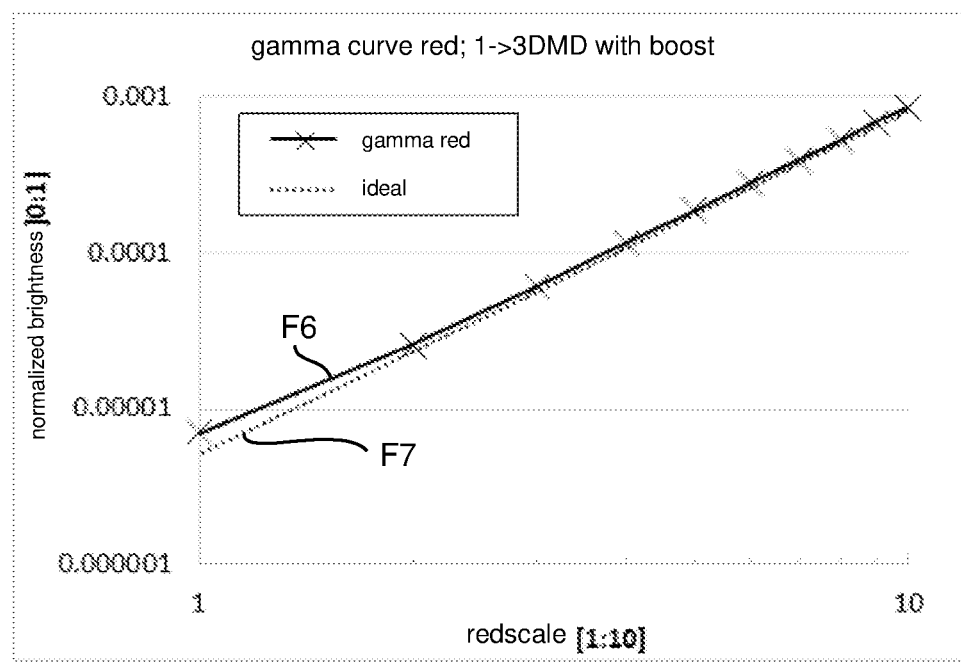
FIG. 31 is the gamma curve for red for the projector according to the invention.
Figure 32:
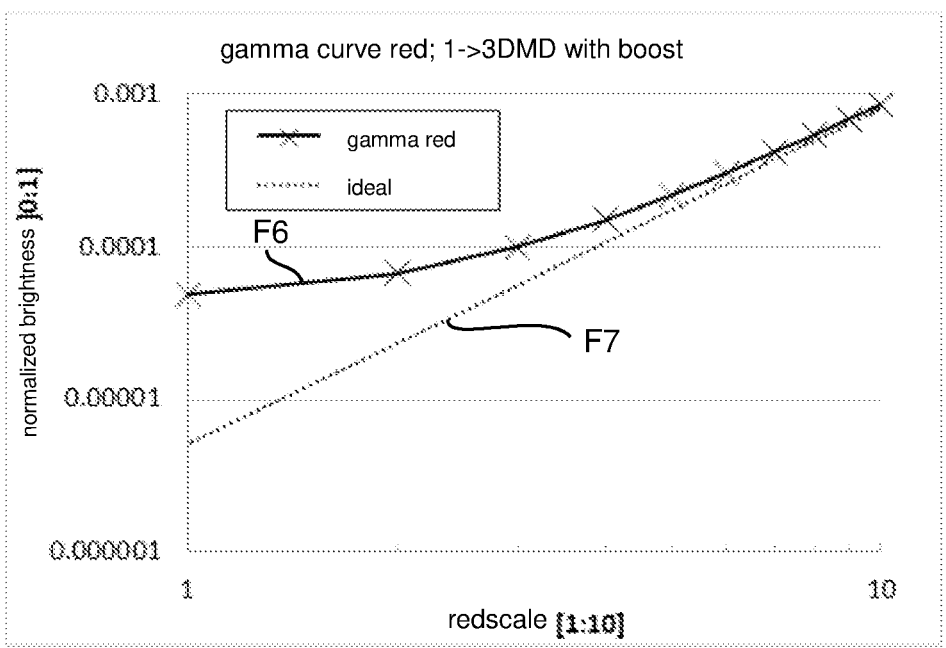
FIG. 32 is the gamma curve for red for a known projector with double modulation.

In this embodiment example the advantages of the solution according to the invention are shown particularly once again. This becomes clear when the dimming of colors which are clearly different from white is observed. For dark red shades, for example—according to the state of the art—green and blue light (corresponding to the contrast in this spectral range) is also transmitted via the first modulator 3, which leads to a desaturation of the colors. Through the boosting proposed here the first modulator 3 (common to all colors) remains on black, while only its residual light—split into color channels—is manipulated by the second modulators. FIGS. 29 and 30 now show, in the same way as FIGS. 25 and 26, the dimming from red (255/0/0) to black (0/0/0) for the "1-3" projector 1 according to the invention (FIG. 29) and a corresponding "1-3" projector of the state of the art in FIG. 30. The gamma curve F6 for red for the "1-3" projector 1 according to the invention is shown in FIG. 31. The corresponding gamma curve F6 for a "1-3" projector of the state of the art is shown in FIG. 32. Here the actual gamma curves F6 are again represented with a continuous line and the ideal gamma curves F7 are represented dotted, in the same way as in FIGS. 27 and 28. A comparison of FIGS. 31 and 32 clearly shows what improvement is achieved with the projector 1 according to the invention. For the rest, reference can be made to the figures in FIG. 24.

The projector 1 according to FIG. 20 also comprises a red, a green and a blue color channel, wherein the first modulator 3 is a constituent of all three color channels. The imaging modulator $5_1$ is part of the red color channel, the imaging modulator $5_2$ is part of the green color channel and the imaging modulator $5_3$ is part of the blue color channel.

Figure 33:
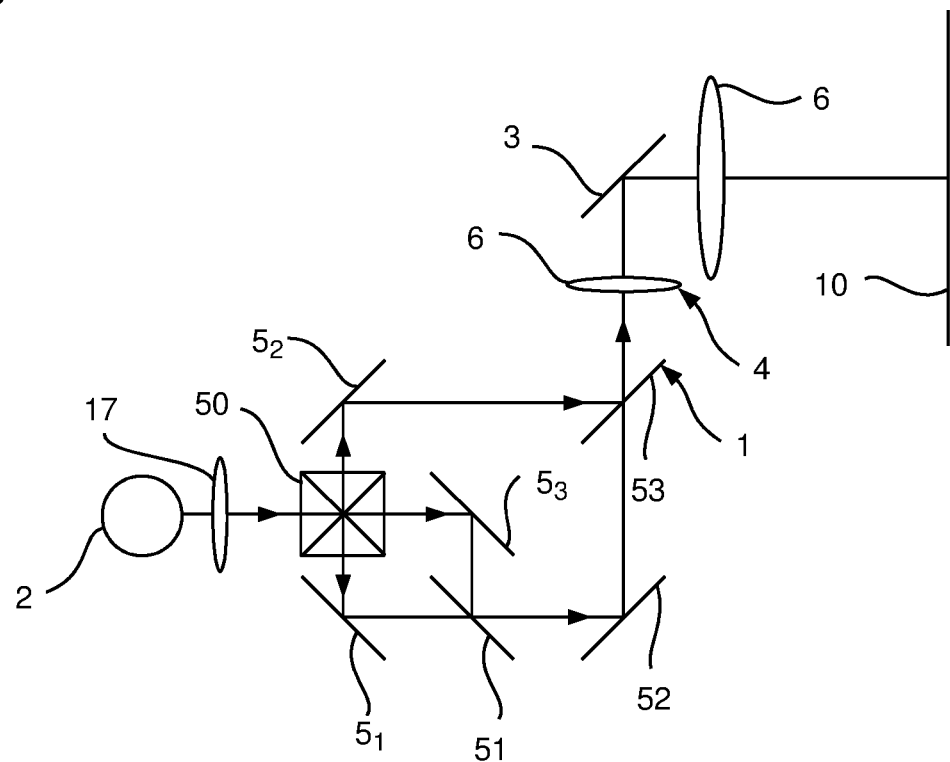
FIG. 33 is a further embodiment example of the projector according to the invention.

The light from the light source 2 can alternatively also be spectrally split first, then deflected via three imaging modulators $5_1$, $5_2$, $5_3$, then combined and guided via a "Clean-Up" modulator 3 and finally projected, as is shown in FIG. 33 (to simplify the representation the control unit 7 is not drawn in). In the above description of the modulator 1 from FIG. 20 and the formulae it is merely necessary to swap "illumination modulator" and "Clean-Up" modulator.

In this embodiment example, the "Clean-Up" modulator 3 is a part in all three color channels. The imaging modulator $5_1$ is part of the red color channel, the imaging modulator $5_2$ is part of the green color channel and the imaging modulator $5_3$ is part of the blue color channel.

In a further embodiment example a projector 1 is observed (FIG. 34; to simplify the representation the control unit 7 is not drawn in), in which the light is first split into a red, a green and a blue color portion. Then the light is deflected via three (color-specific) modulators $3_1$, $3_2$, $3_3$ ("illumination") and subsequently via three (likewise color-specific) modulators $5_1$, $5_2$, $5_3$ ("imaging"). The light is then brought together again and directed via a projection optical system 6 to a projection surface 10. In this example the modulators $3_1$-$3_3$, $5_1$-$5_3$ are six DMDs. In this embodiment example the modulators $3_1$ and $5_1$ are part of the red color channel, the modulators $3_2$ and $5_2$ are part of the green color channel and the modulators $3_3$ and $5_3$ are part of the blue color channel.

In the case of such a "3→3" arrangement equation (21) can be written as:

$$S_{3 \to 3}(\lambda, g_{1r}, g_{1g}, g_{1b}, g_{2r}, g_{2g}, g_{2b}) = \int_{frame} dt \quad I(\lambda) \cdot T_O(\lambda) \cdot \Sigma_{colours} \quad c \in (r,g,b) T_{C,c}(\lambda) \cdot D_{1c}(t, \lambda, g_{1c}) \cdot D_{2c}(t, \lambda, g_{2c})$$ (38)

Here, in $T_{C,c}(\lambda)$, let the transmittance for the color channel $c \in (r, g, b)$ be inclusive of the color splitters and color combiners. $D_{1c}(t, \lambda, g_{1c})$ and $D_{2c}(t, \lambda, g_{2c})$ describe the reflectances of the three illumination and imaging DMDs $3_1$-$3_3$, $5_1$-$5_3$.

For the representation of light image contents, the illumination DMDs $3_1$-$3_3$ will be on white at least at those times when the color-allocated imaging DMD $5_1$-$5_3$ is on white (analogously to a 1→1 DMD system).

If equation (29) is written in a representation with DMD times, then for the representation of dark image contents by means of boosting (analogously to (25) in the first embodiment example):

$$S_{3 \to 3DMD}(\lambda, t_{01,r}, t_{01,g}, t_{01,b}) = \qquad (39)$$

$$\frac{1}{\tau} \cdot I(\lambda) \cdot T_O(\lambda) \cdot \sum_{c \in (r,g,b)} T_{C,c}(\lambda) \cdot D_{1c}(\lambda, \text{"black"}) \cdot$$

$$\{(\tau - t_{01,c}) \cdot D_{2c}(\lambda, \text{"black"}) + t_{01,c} + D_{2c}(\lambda, \text{"white"})\}$$

Here $\tau = \tau_r = \tau_g = \tau_b$.

The times $t_{01,r}$, $t_{01,g}$, $t_{01,b}$, which make it possible to represent a sought value for $\vec{X}_{target}$, are now sought again. Using the equations (3) to (6), the above equation can be transformed to the following requirement:

Find $t_{01,c} \in [0: \tau_c]$ with $c \in \{r, g, b\}$, with the result that $\| \vec{X}_{target} - \vec{X}_{3 \to 3DMD}(t_{01,r}, t_{01,g}, t_{01,b}) \|$ becomes minimal, with $$\vec{X}_{3 \to 3DMD}(t_{01,r}, t_{01,g}, t_{01,b}) = \qquad (40)$$

$$\frac{1}{\tau} \cdot \sum_{c \in (r,g,b)} \{(\tau_c - t_{01,c}) \cdot \vec{X}_{00,c} + t_{01,c} \cdot \vec{X}_{01,c}\}$$

Here $$\vec{X}_{00,c} = \int d\lambda \, I(\lambda) \cdot T_O(\lambda) \cdot \qquad (41)$$

$$D_{1c}(\lambda, \text{"black"}) \cdot D_{2c}(\lambda, \text{"black"}) \cdot T_{C,c}(\lambda) \cdot \begin{pmatrix} \bar{x}(\lambda) \\ \bar{y}(\lambda) \\ \bar{z}(\lambda) \end{pmatrix}$$

$$\vec{X}_{01,c} = \int d\lambda \, I(\lambda) \cdot T_O(\lambda) \cdot \qquad (42)$$

$$D_{1c}(\lambda, \text{"black"}) \cdot D_{2c}(\lambda, \text{"white"}) \cdot T_{C,c}(\lambda) \cdot \begin{pmatrix} \bar{x}(\lambda) \\ \bar{y}(\lambda) \\ \bar{z}(\lambda) \end{pmatrix}$$

Figure 34:
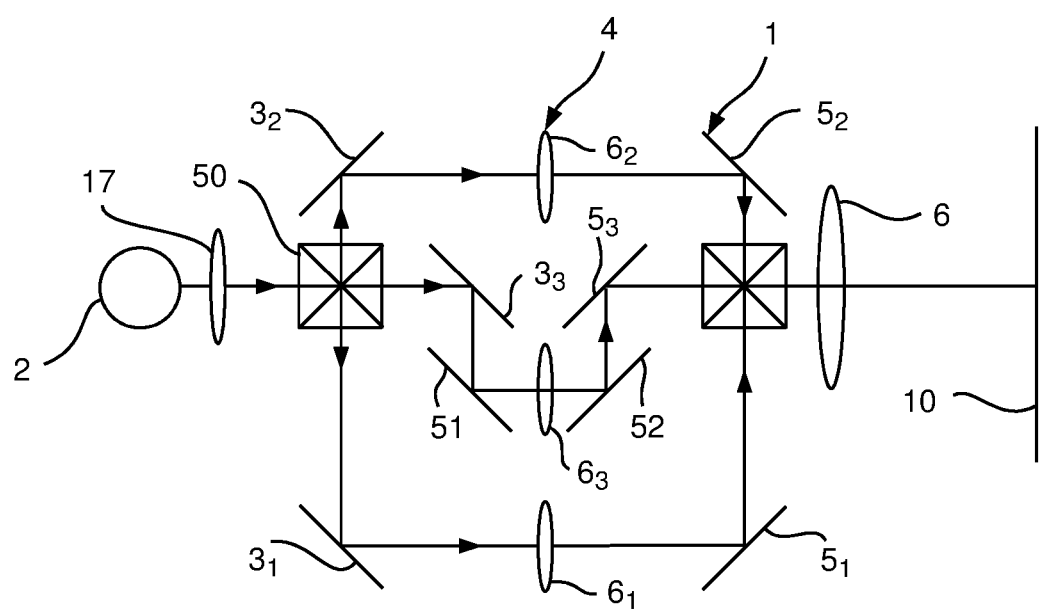
FIG. 34 is a further embodiment example of the projector according to the invention.

These vectors $\vec{X}_{00,c}$ and $\vec{X}_{01,c}$ are variables which can be determined, for example, experimentally for a projector 1 according to FIG. 34.

Embodiment examples are described below, in which image generators or modulators are used which set the lightnesses via a damping. For such image generators, which damp light in dependence on the greyscale value for an entire frame, a time dependence can be dispensed with in the formulae. These are typically systems with LCD or LCoS image generators here.

The transmittance (or reflectivity in the case of an LCoS) can be described simplified in that there is a background transmittance U as well as a modulated transmittance $T_D(\lambda)$:

$$D_D(\lambda, g) = U(\lambda) + \left(\frac{g}{255}\right)^\gamma \cdot T_D(\lambda) \qquad (43)$$

There is no time dependence as the transmittance remains constant during a frame (for the sake of simplicity we are assuming that "broken" greyscale values can represent g via a temporal dithering; an explicit time dependence can thus be dispensed with). $\gamma$ corresponds to the value for gamma, which is chosen as 2.2 in the following example and reproduces the relationship between input greyscale and the resulting lightness.

Analogously to equation (13) for image generators with pulse-width modulation, a double modulation for damping image generators can be written as:

$$S_{D,double}(\lambda, g_{1r}, g_{1g}, g_{1b}, g_{2r}, g_{2g}, g_{2b}) = \\ \Sigma_{colours\ c\in(r,g,b)} I(\lambda) \cdot T_C(c,\lambda) \cdot D_{D1}(t,\lambda,g_{1c}) \cdot D_{D2}(t,\lambda,g_{2c}) \cdot T_O(\lambda) \qquad (44)$$

A possible arrangement is analogous to the projector 1 according to FIG. 20 and has a first modulator 3, which illuminates three further (colored) modulators $5_1$, $5_2$, $5_3$ (modulators for the colors red, green and blue). The modulators 3 and $5_1$-$5_3$ from FIG. 20 are LCD or LCoS modulators in the embodiment example described now. As a result:

$$S_{D,1\to 3}(\lambda, g_1, g_{2r}, g_{2g}, g_{2b}) = I(\lambda) \cdot D_{D1}(\lambda, g_1) \cdot \\ T_O(\lambda) \cdot \Sigma_{colours\ c\in(r,g,b)} T_{C,c}(\lambda) \cdot D_{2c}(\lambda, g_{2c}) \qquad (45)$$

For dark image contents, a boosting can also be effected here by switching the first (common) modulator 3 to black. Using (43) the following results:

$$S_{D,1\to 3}(\lambda, g_{2r}, g_{2g}, g_{2b}) = \qquad (46)$$

$$I(\lambda) \cdot U_1(\lambda) \cdot T_O(\lambda) \cdot \sum_{c\in(r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$

The variables $g_{2r}$, $g_{2g}$, $g_{2b}$, which make it possible to represent a sought value for $\vec{X}_{target}$, are now sought. Using the equations (3) to (6), the above equation can be transformed to the following requirement:

Find $g_{2,c} \in [0:255]$ with $c \in \{r, g, b\}$, with the result that $\| \vec{X}_{target} - \vec{X}_{D,1\to 3}(g_{2r}, g_{2g}, g_{2b}) \|$ becomes minimal, with $$\vec{X}_{D,1\to 3}(g_{2r}, g_{2g}, g_{2b}) = \sum_{c\in(r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\} \qquad (47)$$

Here $$\vec{X}_{00,c} = \int d\lambda\ I(\lambda) \cdot T_O(\lambda) \cdot U_1(\lambda) \cdot U_{2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \qquad (48)$$

$$\vec{X}_{01,c} = \int d\lambda\ I(\lambda) \cdot T_O(\lambda) \cdot U_1(\lambda) \cdot T_{D2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \qquad (49)$$

These vectors $\vec{X}_{00,c}$ and $\vec{X}_{01,c}$ are variables which can be determined, for example, experimentally for the projector 1.

Again, this is thus a linear system of equations for the variables $$\left(\frac{g_{2r}}{255}\right)^\gamma, \left(\frac{g_{2g}}{255}\right)^\gamma \text{ and } \left(\frac{g_{2b}}{255}\right)^\gamma,$$

which can be resolved according to the sought greyscale values $g_{2r}$, $g_{2g}$, $g_{2b}$.

The statements apply analogously to an arrangement in which the light is first split and guided via three image generators $5_1$, $5_2$, $5_3$, in order then to be combined and guided via a "Clean-Up" modulator 3 (as e.g. in FIG. 34).

A further possible arrangement for LCD or LCoS modulators is analogous to the projector 1 according to FIG. 34 and has three first (colored) modulators $3_1$, $3_2$, $3_3$, downstream of which three further (colored) modulators $5_1$, $5_2$, $5_3$ are arranged. As a result:

$$S_{D,3\to 3}(\lambda, g_{1r}, g_{1g}, g_{1b}, g_{2r}, g_{2g}, g_{2b}) = I(\lambda) \cdot T_O(\lambda) \cdot \\ \Sigma_{colours\ c\in(r,g,b)} D_{D1c}(\lambda, g_{1c}) \cdot T_{C,c}(\lambda) \cdot D_{2c}(\lambda, g_{2c}) \qquad (50)$$

For dark image contents, a boosting can also be effected here by switching the first modulators $3_1$-$3_3$ to black. Using (43) the following results:

$$S_{D,3\to 3}(\lambda, g_{2r}, g_{2g}, g_{2b}) = \qquad (51)$$

$$I(\lambda) \cdot U_{1c}(\lambda) \cdot T_O(\lambda) \cdot \sum_{c\in(r,g,b)} T_{C,c}(\lambda) \cdot \left\{ U_{2c}(\lambda) + \left(\frac{g_{2c}}{255}\right)^\gamma \cdot T_{D2c}(\lambda) \right\}$$

The variables $g_{2r}$, $g_{2g}$, $g_{2b}$, which make it possible to represent a sought value for $\vec{X}_{target}$, are now sought again. Using the equations (3) to (6), the above equation can be transformed to the following requirement:

Find $g_{2,c} \in [0:255]$ with $c \in \{r, g, b\}$, with the result that $\| \vec{X}_{target} - \vec{X}_{D,3\to 3}(g_{2r}, g_{2g}, g_{2b}) \|$ becomes minimal, with $$\vec{X}_{D,3\to 3}(g_{2r}, g_{2g}, g_{2b}) = \sum_{c\in(r,g,b)} \left\{ \left(1 - \left(\frac{g_{2c}}{255}\right)^\gamma\right) \cdot \vec{X}_{00,c} + \left(\frac{g_{2c}}{255}\right)^\gamma \cdot \vec{X}_{01,c} \right\} \qquad (52)$$

Here $$\vec{X}_{00,c} = \int d\lambda\ I(\lambda) \cdot T_O(\lambda) \cdot U_{1c}(\lambda) \cdot U_{2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \qquad (53)$$

$$\vec{X}_{01,c} = \int d\lambda\ I(\lambda) \cdot T_O(\lambda) \cdot U_{1c}(\lambda) \cdot T_{D2c}(\lambda) \cdot T_{C,c}(\lambda) \cdot \begin{pmatrix} \bar{x}(\lambda) \\ \bar{y}(\lambda) \\ \bar{z}(\lambda) \end{pmatrix} \qquad (54)$$

These vectors $\vec{X}_{00,c}$ and $\vec{X}_{01,c}$ are variables which can be determined, for example, experimentally for a projection system 1.

Again, this is thus a linear system of equations for the variables $$\left(\frac{g_{2r}}{255}\right)^\gamma, \left(\frac{g_{2g}}{255}\right)^\gamma \text{ and } \left(\frac{g_{2b}}{255}\right)^\gamma,$$

which can be resolved according to the sought greyscale values $g_{2r}$, $g_{2g}$, $g_{2b}$.

In the description, only a dimming from white and red has been discussed in the examples. In general a double modulation also makes a lower desaturation of the primary colors during dimming possible. The shorter the illumination for dark colors can be, the better the effect is. The advantage becomes clear in particular in the case of a 1→3 DMD arrangement (see e.g. FIGS. 23 and 24).

In the case of the projector 201 with double modulation according to FIG. 13 according to the state of the art, no modulation of residual light is carried out; there neither image generator is set to black for non-black image contents.

Should a boosting be carried out such that for the boosted greyscale values only one factor is indicated, by which these greyscale values have to be greater, the desired correction of the variation in color location would lead to poor results. The reasons for this are:

Even the boosted primary colors have a different color location from the original primary colors. Therefore, one factor can only take into account the differences in lightness and not the color.

The second modulator (the one which does the boosting) also has a finite contrast. Therefore, dark boosted values must be represented darker than results via the factor.

The more the black point deviates from the white point and the lower the contrast of the second (boosting) modulator is, the more important the two named reasons become.

At least factors which are different for each color should be predefined.

In order to correctly generate the lightnesses in the case of dark but unboosted values (which are typically too light, when the RGB input values are transmitted directly to the second image generator), the value output on the second image generator can already be damped here too. This can also already be derived from the described formalism according to equation (11).

The proposed solution is also applicable to systems which comprise secondary colors (or spokes). The solutions for a control of the boosted values remain clear when limited to a boosting via the primary colors (linear relationship between three values of color valences of the target color and three greyscale values for primary colors).

In the embodiment examples with DMDs as modulators, it is not necessary for all modulators to be DMDs. As one of the modulators of the double modulation is on black, this can also be a modulator based on dimming (such as e.g. LCD or LCoS). Only the observations regarding the ON and OFF times are DMD-specific.

It is not necessary to perform boosting only when all three color portions can be boosted (thus are darker than the contrast of the first modulator). Instead, the system of formulae can also be used when only one or two of the three colors can be boosted. In this case, the times $t_{11,c}$ and $t_{10,c}$ of the corresponding color c are not equal to zero. Because of the discretization during a representation of colors, there is also a solution here for those (more than three sought times) which leads to a minimal color and lightness deviation (or a solution which is better than according to the state of the art).

In principle, a color-sequential imaging can also be carried out with LCD or LCoS. In this case, the relative duration of the colors can be taken into account in the formulae via a prefactor.

The system of formulae can also be transferred to systems in which the colors are generated via colored light sources (such as laser, LED, laser phosphor, etc.). In this case the above-named spectra for light source and color filter are to be brought together in a single spectrum for the colored light source.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. Projector for projecting a multi-colored image, comprising:
several color channels in order to generate color subframes of the multi-colored image to be projected,
wherein each color channel comprises
a first modulator, comprising several first pixels that are controllable independently of each other in order to modulate light from a light source by which the first modulator can be impinged;
an imaging optical system; and
a second modulator, comprising several second pixels that are controllable independently of each other, which can be impinged by the light modulated by the first modulator via the imaging optical system and modulate the light via the second pixels in order to generate a color subframe,
a control unit that actuates each color channel with reference to fed-in image data such that one of the color subframes of the multi-colored image to be projected is generated; and
a projection optical system that images the generated color subframes onto a projection surface such that the color subframes can be perceived as the multi-colored image to be projected,
wherein each color channel is formed for the generation of a color subframe of a predetermined base color,
wherein at least one of the color channels has a wavelength-dependent contrast which leads to a variation of a color space location of the predetermined base color with the lightness to be generated, and
wherein the control unit controls each color channel such that, for at least one picture point in the multi-colored image, which is to comprise a predetermined target color space location and a predetermined target lightness according to the image data, the color space location shift of the predetermined target color space location caused by the color channel or the color channels is compensated for by compensating the wavelength-dependent contrast while retaining the target lightness.

2. The projector according to claim 1, wherein during control of the color channels the control unit is configured to adjust the compensation such that a greater amount of compensation is performed as the target lightness decreases further below the target lightness.

3. The projector according to claim 2, wherein each second pixel is allocated at least one first pixel in such a way that the imaging optical system:
a) strikes the second pixel with light from the respectively allocated first pixel when the allocated first pixel is switched into a first state, in order to actively illuminate the second pixel, and
b) does not strike the second pixel with light from the respectively allocated first pixel when the allocated first pixel is switched into the second state, in order not to actively illuminate the second pixel, with the result that only unavoidable residual light strikes the second pixel, wherein the control unit controls the modulators such that, for at least one second pixel, which, according to the image data, is to represent a lightness value which is greater than zero and smaller than a predetermined first threshold value, c) the at least one second pixel is switched into the second state and the allocated first pixel or pixels is or are switched into the first state for lightness modulation only for the period or periods in which the second pixel is switched into the second state, with the result that modulated residual light then emanates from the at least one second pixel, which contributes to the image generation, or d) the allocated first pixel or pixels is or are switched into the second state at least in the periods in which the second pixel is switched into the first state, with the result that no active illumination takes place and the second pixel modulates the residual light.

4. The projector according to claim 2, wherein the control unit has predetermined and stored correction values for the color channels for target color space locations with allocated target lightnesses that can be generated by means of the projector, wherein the control unit uses the correction values for compensation during the control of the color channels.

5. The projector according to claim 4, wherein each second pixel is allocated at least one first pixel in such a way that the imaging optical system:

a) strikes the second pixel with light from the respectively allocated first when the allocated first pixel is switched into the first state, in order to actively illuminate the second pixel, and b) does not strike the second pixel with light from the respectively allocated first pixel when the allocated first pixel is switched into the second state, in order not to actively illuminate the second pixel, with the result that only unavoidable residual light strikes the second pixel, wherein the control unit controls the modulators such that, for at least one second pixel, which, according to the image data, is to represent a lightness value which is greater than zero and smaller than a predetermined first threshold value, c) the at least one second pixel is switched into the second state and the allocated first pixel or pixels is or are switched into the first state for lightness modulation only for the period or periods in which the second pixel is switched into the second state, with the result that modulated residual light then emanates from the at least one second pixel, which contributes to the image generation, or d) the allocated first pixel or pixels is or are switched into the second state at least in the periods in which the second pixel is switched into the first state, with the result that no active illumination takes place and the second pixel modulates the residual light.

6. The projector according to claim 1, wherein the control unit has predetermined and stored correction values for the color channels for target color space locations with allocated target lightnesses that can be generated by means of the projector, wherein the control unit uses the correction values for compensation during the control of the color channels.

7. The projector according to claim 6, wherein each second pixel is allocated at least one first pixel in such a way that the imaging optical system:

a) strikes the second pixel with light from the respectively allocated first when the allocated first pixel is switched into the first state, in order to actively illuminate the second pixel, and b) does not strike the second pixel with light from the respectively allocated first pixel when the allocated first pixel is switched into the second state, in order not to actively illuminate the second pixel, with the result that only unavoidable residual light strikes the second pixel, wherein the control unit controls the modulators such that, for at least one second pixel, which, according to the image data, is to represent a lightness value which is greater than zero and smaller than a predetermined first threshold value, c) the at least one second pixel is switched into the second state and the allocated first pixel or pixels is or are switched into the first state for lightness modulation only for the period or periods in which the second pixel is switched into the second state, with the result that modulated residual light then emanates from the at least one second pixel, which contributes to the image generation, or d) the allocated first pixel or pixels is or are switched into the second state at least in the periods in which the second pixel is switched into the first state, with the result that no active illumination takes place and the second pixel modulates the residual light.

8. The projector according to claim 1, wherein each second pixel is allocated at least one first pixel in such a way that the imaging optical system:

a) strikes the second pixel with light from the respectively allocated first when the allocated first pixel is switched into the first state, in order to actively illuminate the second pixel, and b) does not strike the second pixel with light from the respectively allocated first pixel when the allocated first pixel is switched into the second state, in order not to actively illuminate the second pixel, with the result that only unavoidable residual light strikes the second pixel, wherein the control unit controls the modulators such that, for at least one second pixel, which, according to the image data, is to represent a lightness value which is greater than zero and smaller than a predetermined first threshold value, c) the at least one second pixel is switched into the second state and the allocated first pixel or pixels is or are switched into the first state for lightness modulation only for the period or periods in which the second pixel is switched into the second state, with the result that modulated residual light then emanates from the at least one second pixel, which contributes to the image generation, or d) the allocated first pixel or pixels is or are switched into the second state at least in the periods in which the second pixel is switched into the first state, with the result that no active illumination takes place and the second pixel modulates the residual light.

9. The projector according to claim 8, wherein the control unit controls a modulating pixel for the generation of the modulated residual light based on a lightness value which is greater than the target lightness according to the image data.

10. The projector according to claim 8, wherein the control unit adapts the compensation to the color space location with a threshold value as target lightness value.

11. The projector according to claim 10, wherein the control unit controls the modulating pixel for the generation of the modulated residual light based on a lightness value which is greater than the target lightness according to the image data.

12. The projector according to claim 1, wherein the control unit controls the modulators by means of pulse-width modulated control data.

13. The projector according to claim 1, wherein the modulators are formed as reflective modulators.

* * * * *

UNITED STATES PATENT AND TRADEMARK OFFICE
CERTIFICATE OF CORRECTION

PATENT NO. : 10,832,612 B2
APPLICATION NO. : 16/028400
DATED : November 10, 2020
INVENTOR(S) : Christoph Nieten et al.

It is certified that error appears in the above-identified patent and that said Letters Patent is hereby corrected as shown below:

In the Specification

Column 10, Line 11:
Delete "size (which thus extend over an angle range of 60). The color"
And replace with -- size (which thus extend over an angle range of 60°). The color --

Column 11, Line 23-34 Equation 1:
Delete

" $S_1(\lambda, g_1) = \int_\Omega d\Omega \int_{frame} dt \Sigma_{colours} \; c \in (r,g,b) I(\Omega, t, \lambda) \cdot T_B(\Omega, \lambda) \cdot T_C(\Omega, c, \lambda) \cdot D_1(\Omega, t, c, \lambda, g_1) \cdot T_P(\Omega, \lambda)$ "

And replace with

-- $S_1(\lambda, g_1) = \int_\Omega d\Omega \int_{frame} dt \; \Sigma_{colours \; c \in (r,g,b)} I(\Omega, t, \lambda) \cdot T_B(\Omega, \lambda) \cdot T_C(\Omega, c, \lambda) \cdot D_1(\Omega, t, c, \lambda, g_1) \cdot T_P(\Omega, \lambda)$ --

Column 13, Line 56-57:
Delete "g greyscale value which is represented on the first image generator 203, can be the triple for r, g, b"
And replace with
-- $g_1$     greyscale value which is represented on the first image generator 203, can be the triple for r, g, b --

Column 15, Line 54 Equation 18:
Delete "$t_{10,c} = \min\{0.012 \cdot \tau_c; \tau_c - \tau_{11,c}\}$"
And replace with -- $t_{10,c} = \min\{0.012 \cdot \tau_c; \tau_c - t_{11,c}\}$ --

Column 16, Line 14:
Delete "(re) is calculated according to (18)."

Signed and Sealed this
Sixth Day of June, 2023

Katherine Kelly Vidal
*Director of the United States Patent and Trademark Office*

CERTIFICATE OF CORRECTION (continued)
U.S. Pat. No. 10,832,612 B2

And replace with -- ($\tau_c$) is calculated according to (18). --

Column 20, Line 56-58 Equation 32:

Delete "
$$\vec{X} = \vec{X}_{target} - \frac{1}{\tau_r + \tau_g + \tau_b} \cdot \sum_{c \in (r,g,b)} \tau_c \cdot \vec{X}_{00,c}$$
"
And replace with $$\vec{X} = \vec{X}_{target} - \frac{1}{\tau_r + \tau_g + \tau_b} \cdot \sum_{c \in (r,g,b)} \tau_c \cdot \vec{X}_{00,c}$$
--

Column 21, Line 65:

Delete "Find $t_{01,c} \in [0: \tau c]$ with $c \in \{r, g, b\}$, with the result that ||"
And replace with -- Find $t_{01,c} \in [0:\tau_c]$ with $c \in \{r, g, b\}$ with the result that || --